US009705852B2

(12) United States Patent
Bollay et al.

(10) Patent No.: US 9,705,852 B2
(45) Date of Patent: *Jul. 11, 2017

(54) PROXY SSL AUTHENTICATION IN SPLIT SSL FOR CLIENT-SIDE PROXY AGENT RESOURCES WITH CONTENT INSERTION

(71) Applicant: F5 Networks, Inc., Seattle, WA (US)

(72) Inventors: Benn Sapin Bollay, Seattle, WA (US); Jonathan Mini Hawthorne, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,127

(22) Filed: Sep. 16, 2015

(65) Prior Publication Data
US 2016/0072811 A1     Mar. 10, 2016

Related U.S. Application Data

(63) Continuation of application No. 13/779,530, filed on Feb. 27, 2013, now Pat. No. 9,178,706, which is a
(Continued)

(51) Int. Cl.
*H04L 29/06* (2006.01)
*H04L 9/32* (2006.01)
(Continued)

(52) U.S. Cl.
CPC ........ *H04L 63/0428* (2013.01); *H04L 9/3244* (2013.01); *H04L 63/0245* (2013.01);
(Continued)

(58) Field of Classification Search
CPC ............... H04L 63/0428; H04L 9/3244; H04L 63/0245; H04L 63/0884; H04L 63/166;
(Continued)

(56) References Cited

U.S. PATENT DOCUMENTS 5,267,314 A    11/1993  Stambler
5,319,638 A     6/1994  Lin
(Continued)

FOREIGN PATENT DOCUMENTS

CN    1615632 A     5/2005
EP    1533982 A2    5/2005
(Continued)

OTHER PUBLICATIONS

Official Communication for U.S. Appl. No. 14/320,331 mailed on Mar. 28, 2016, 18 pages.
(Continued)

*Primary Examiner* — Michael S McNally
(74) *Attorney, Agent, or Firm* — John W. Branch; Lowe Graham Jones PLLC

(57) ABSTRACT

A traffic management device (TMD), system, and processor-readable storage medium are directed to determining that an end-to-end encrypted session has been established between a client and an authentication server, intercepting and decrypting subsequent task traffic from the client, and forwarding the intercepted traffic toward a server. In some embodiments, a second connection between the TMD and server may be employed to forward the intercepted traffic, and the second connection may be unencrypted or encrypted with a different mechanism than the encrypted connection to the authentication server. The encrypted connection to the authentication server may be maintained following authentication to enable termination of the second connection if the client becomes untrusted, and/or to enable logging of client requests, connection information, and the like. In some embodiments, the TMD may act as a proxy to provide client access to a number of servers and/or resources.

17 Claims, 11 Drawing Sheets

Related U.S. Application Data continuation of application No. 12/846,778, filed on Jul. 29, 2010, now Pat. No. 8,700,892.

(60) Provisional application No. 61/315,857, filed on Mar. 19, 2010.

(51) Int. Cl.
  *H04L 29/08* (2006.01)
  *G06F 21/60* (2013.01)

(52) U.S. Cl.
  CPC ........ *H04L 63/0884* (2013.01); *H04L 63/166* (2013.01); *H04L 63/306* (2013.01); *H04L 67/14* (2013.01); *G06F 21/604* (2013.01); *H04L 67/28* (2013.01)

(58) Field of Classification Search
  CPC ....... H04L 63/306; H04L 67/14; H04L 67/28; G06F 21/604
  USPC ........................................................ 713/170
  See application file for complete search history.

(56) References Cited

U.S. PATENT DOCUMENTS

| | | | |
|---|---|---|---|
| 5,412,730 A | 5/1995 | Jones | |
| 5,524,073 A | 6/1996 | Stambler | |
| 5,657,390 A | 8/1997 | Elgamal et al. | |
| 5,793,302 A | 8/1998 | Stambler | |
| 5,825,890 A | 10/1998 | Elgamal et al. | |
| 5,936,541 A | 8/1999 | Stambler | |
| 5,974,143 A | 10/1999 | Davis | |
| 5,991,881 A | 11/1999 | Conklin et al. | |
| 6,052,785 A | 4/2000 | Lin et al. | |
| 6,061,454 A | 5/2000 | Malik et al. | |
| 6,084,969 A | 7/2000 | Wright et al. | |
| 6,094,485 A | 7/2000 | Weinstein et al. | |
| 6,104,716 A | 8/2000 | Crichton et al. | |
| 6,105,067 A | 8/2000 | Batra | |
| 6,134,584 A | 10/2000 | Chang et al. | |
| 6,175,869 B1 | 1/2001 | Ahuja et al. | |
| 6,212,636 B1 | 4/2001 | Boyle et al. | |
| 6,223,287 B1 | 4/2001 | Douglas et al. | |
| 6,367,009 B1 | 4/2002 | Davis et al. | |
| 6,374,300 B2 | 4/2002 | Masters | |
| 6,526,131 B1 | 2/2003 | Zimmerman et al. | |
| 6,546,423 B1 | 4/2003 | Dutta et al. | |
| 6,584,567 B1 | 6/2003 | Bellwood et al. | |
| 6,643,701 B1 | 11/2003 | Aziz et al. | |
| 6,658,114 B1 | 12/2003 | Farn et al. | |
| 6,674,717 B1 | 1/2004 | Duong-van et al. | |
| 6,681,327 B1 | 1/2004 | Jardin | |
| 6,704,798 B1 | 3/2004 | Mogul | |
| 6,718,388 B1 | 4/2004 | Yarborough et al. | |
| 6,724,893 B1 | 4/2004 | Petro | |
| 6,728,884 B1 | 4/2004 | Lim | |
| 6,732,269 B1 | 5/2004 | Baskey et al. | |
| 6,751,677 B1 | 6/2004 | Ilnicki et al. | |
| 6,799,270 B1 | 9/2004 | Bull et al. | |
| 6,918,041 B1 | 7/2005 | Chen | |
| 6,996,841 B2 | 2/2006 | Kadyk et al. | |
| 7,007,163 B2 | 2/2006 | Tardo et al. | |
| 7,010,608 B2 | 3/2006 | Garg et al. | |
| 7,017,049 B2 | 3/2006 | Hand et al. | |
| 7,043,632 B2 | 5/2006 | Chapman et al. | |
| 7,073,066 B1 | 7/2006 | Nessett | |
| 7,082,535 B1 | 7/2006 | Norman et al. | |
| 7,093,121 B2 | 8/2006 | Barton et al. | |
| 7,120,666 B2 | 10/2006 | McCanne et al. | |
| 7,136,997 B2 | 11/2006 | Yamaguchi et al. | |
| 7,137,143 B2 | 11/2006 | Chawla et al. | |
| 7,142,676 B1 * | 11/2006 | Hillier ................... | H04L 9/0894 380/258 |
| 7,146,505 B1 | 12/2006 | Harada et al. | |
| 7,149,892 B2 | 12/2006 | Freed et al. | |
| 7,174,565 B2 | 2/2007 | Kadyk et al. | |
| 7,206,846 B1 | 4/2007 | Dini et al. | |
| 7,219,120 B2 | 5/2007 | Hui | |
| 7,222,234 B2 | 5/2007 | Martin et al. | |
| 7,240,366 B2 | 7/2007 | Buch et al. | |
| 7,249,377 B1 | 7/2007 | Lita et al. | |
| 7,254,237 B1 | 8/2007 | Jacobson et al. | |
| 7,269,659 B2 | 9/2007 | Kadyk et al. | |
| 7,293,034 B2 | 11/2007 | Paya et al. | |
| 7,318,100 B2 | 1/2008 | Demmer et al. | |
| 7,343,398 B1 | 3/2008 | Lownsbrough | |
| 7,370,015 B2 | 5/2008 | Gvily | |
| 7,370,351 B1 | 5/2008 | Ramachandran et al. | |
| 7,401,159 B1 | 7/2008 | Aviani et al. | |
| 7,421,735 B2 | 9/2008 | Kerstens et al. | |
| 7,430,557 B1 | 9/2008 | Loboz et al. | |
| 7,430,755 B1 | 9/2008 | Hughes et al. | |
| 7,430,757 B1 | 9/2008 | Chari et al. | |
| 7,472,413 B1 * | 12/2008 | Mowshowitz .......... | G06F 21/31 726/10 |
| 7,493,383 B1 | 2/2009 | Mukerji | |
| 7,502,726 B2 | 3/2009 | Panasyuk et al. | |
| 7,506,368 B1 | 3/2009 | Kersey et al. | |
| 7,506,369 B2 | 3/2009 | Buch et al. | |
| 7,516,485 B1 | 4/2009 | Lee et al. | |
| 7,543,146 B1 | 6/2009 | Karandikar et al. | |
| 7,568,114 B1 | 7/2009 | Schlafly | |
| 7,584,505 B2 | 9/2009 | Mondri et al. | |
| 7,647,404 B2 | 1/2010 | Cooper et al. | |
| 7,661,131 B1 | 2/2010 | Shaw et al. | |
| 7,742,406 B1 * | 6/2010 | Muppala ............. | H04L 41/5022 370/230 |
| 7,769,994 B2 | 8/2010 | Peles | |
| 7,770,007 B2 | 8/2010 | Bobde et al. | |
| 7,827,405 B2 | 11/2010 | Christiansen et al. | |
| 7,853,699 B2 | 12/2010 | Wu et al. | |
| 7,865,720 B2 | 1/2011 | Little et al. | |
| 7,890,751 B1 | 2/2011 | Morris et al. | |
| 7,895,446 B2 | 2/2011 | Harada et al. | |
| 7,904,949 B2 | 3/2011 | Bowers et al. | |
| 7,904,951 B1 | 3/2011 | Ebrahimi et al. | |
| 7,958,347 B1 | 6/2011 | Ferguson | |
| 7,979,555 B2 | 7/2011 | Rothstein et al. | |
| 7,984,160 B2 | 7/2011 | Lam | |
| 7,996,886 B1 | 8/2011 | Hughes et al. | |
| 8,001,371 B2 | 8/2011 | Langer | |
| 8,020,201 B2 | 9/2011 | Adusumilli et al. | |
| 8,116,776 B2 | 2/2012 | Jagadeesan et al. | |
| 8,176,186 B2 | 5/2012 | McCanne et al. | |
| 8,190,875 B2 | 5/2012 | Lev Ran et al. | |
| 8,225,085 B2 | 7/2012 | Karandikar | |
| 8,266,452 B2 | 9/2012 | Dunn et al. | |
| 8,478,986 B2 | 7/2013 | Merugu et al. | |
| 8,613,071 B2 | 12/2013 | Day et al. | |
| 8,615,795 B2 | 12/2013 | Cottrell et al. | |
| 8,650,389 B1 | 2/2014 | Thornewell et al. | |
| 9,338,147 B1 | 5/2016 | Rothstein et al. | |
| 2001/0037387 A1 | 11/2001 | Gilde et al. | |
| 2001/0047474 A1 | 11/2001 | Takagi et al. | |
| 2002/0016911 A1 | 2/2002 | Chawla et al. | |
| 2002/0023145 A1 | 2/2002 | Orr et al. | |
| 2002/0035681 A1 | 3/2002 | Maturana et al. | |
| 2002/0062372 A1 | 5/2002 | Hong et al. | |
| 2002/0069241 A1 | 6/2002 | Narlikar et al. | |
| 2002/0138551 A1 | 9/2002 | Erickson | |
| 2002/0157019 A1 | 10/2002 | Kadyk et al. | |
| 2002/0163884 A1 | 11/2002 | Peles et al. | |
| 2002/0165928 A1 | 11/2002 | Landfeldt et al. | |
| 2002/0199095 A1 * | 12/2002 | Bandini ................. | H04L 12/585 713/151 |
| 2002/0199098 A1 | 12/2002 | Davis | |
| 2003/0005280 A1 | 1/2003 | Bobde et al. | |
| 2003/0014628 A1 * | 1/2003 | Freed ................... | H04L 63/0281 713/155 |
| 2003/0014650 A1 | 1/2003 | Freed et al. | |
| 2003/0105810 A1 | 6/2003 | McCrory et al. | |
| 2003/0196084 A1 | 10/2003 | Okereke et al. | |
| 2003/0200332 A1 | 10/2003 | Gupta et al. | |

(56) References Cited

U.S. PATENT DOCUMENTS

| | | |
|---|---|---|
| 2003/0233539 A1 | 12/2003 | Tardo et al. |
| 2004/0010596 A1 | 1/2004 | Hui |
| 2004/0015725 A1 | 1/2004 | Boneh et al. |
| 2004/0088542 A1 | 5/2004 | Daude et al. |
| 2004/0123159 A1 | 6/2004 | Kersten et al. |
| 2004/0210756 A1 | 10/2004 | Mowers et al. |
| 2004/0215746 A1 | 10/2004 | McCanne et al. |
| 2004/0243703 A1 | 12/2004 | Demmer et al. |
| 2005/0001660 A1 | 1/2005 | Roy |
| 2005/0008158 A1 | 1/2005 | Huh et al. |
| 2005/0021956 A1 | 1/2005 | Genty et al. |
| 2005/0044160 A1* | 2/2005 | McElligott ............ H04L 51/28 709/207 |
| 2005/0050316 A1 | 3/2005 | Peles |
| 2005/0050362 A1 | 3/2005 | Peles |
| 2005/0060426 A1 | 3/2005 | Samuels et al. |
| 2005/0063303 A1 | 3/2005 | Samuels et al. |
| 2005/0065799 A1 | 3/2005 | Dare et al. |
| 2005/0074007 A1 | 4/2005 | Samuels et al. |
| 2005/0081029 A1 | 4/2005 | Thornton et al. |
| 2005/0108420 A1 | 5/2005 | Brown et al. |
| 2005/0108517 A1 | 5/2005 | Dillon et al. |
| 2005/0125553 A1 | 6/2005 | Wu et al. |
| 2005/0138353 A1 | 6/2005 | Spies et al. |
| 2005/0138359 A1 | 6/2005 | Simon et al. |
| 2005/0144463 A1 | 6/2005 | Rossebo et al. |
| 2005/0160161 A1 | 7/2005 | Barrett et al. |
| 2005/0187979 A1 | 8/2005 | Christensen et al. |
| 2005/0203849 A1 | 9/2005 | Benson |
| 2005/0240777 A1 | 10/2005 | Keohane et al. |
| 2005/0265235 A1 | 12/2005 | Accapadi et al. |
| 2005/0265327 A1 | 12/2005 | Buch et al. |
| 2005/0273850 A1 | 12/2005 | Freund |
| 2006/0005239 A1 | 1/2006 | Mondri et al. |
| 2006/0036859 A1 | 2/2006 | Adams et al. |
| 2006/0069719 A1 | 3/2006 | McCanne et al. |
| 2006/0075114 A1 | 4/2006 | Panasyuk et al. |
| 2006/0101510 A1 | 5/2006 | Kadyk et al. |
| 2006/0143700 A1 | 6/2006 | Herrmann |
| 2006/0143702 A1 | 6/2006 | Hisada et al. |
| 2006/0168210 A1 | 7/2006 | Ahonen et al. |
| 2006/0174106 A1 | 8/2006 | Bell et al. |
| 2006/0190612 A1 | 8/2006 | Kahol et al. |
| 2006/0209789 A1 | 9/2006 | Gupta et al. |
| 2006/0212524 A1 | 9/2006 | Wu et al. |
| 2006/0212935 A1 | 9/2006 | Burman et al. |
| 2006/0248194 A1 | 11/2006 | Ly et al. |
| 2006/0253703 A1 | 11/2006 | Eronen et al. |
| 2007/0038853 A1* | 2/2007 | Day ..................... H04L 63/0281 713/153 |
| 2007/0058807 A1 | 3/2007 | Marsh |
| 2007/0067834 A1 | 3/2007 | Saito |
| 2007/0074282 A1 | 3/2007 | Black et al. |
| 2007/0078986 A1 | 4/2007 | Ethier et al. |
| 2007/0094373 A1 | 4/2007 | Brendel |
| 2007/0101412 A1 | 5/2007 | Yang et al. |
| 2007/0180227 A1* | 8/2007 | Akimoto ............ H04L 63/1408 713/153 |
| 2007/0180510 A1 | 8/2007 | Long et al. |
| 2007/0192845 A1 | 8/2007 | Lankheim |
| 2007/0198836 A1 | 8/2007 | Fedyk et al. |
| 2007/0199061 A1 | 8/2007 | Byres et al. |
| 2007/0266233 A1 | 11/2007 | Jethanandani et al. |
| 2008/0046714 A1 | 2/2008 | Suganthi et al. |
| 2008/0060055 A1 | 3/2008 | Lau |
| 2008/0065880 A1 | 3/2008 | Martin |
| 2008/0077982 A1 | 3/2008 | Hayler et al. |
| 2008/0101445 A1 | 5/2008 | Ho et al. |
| 2008/0115200 A1 | 5/2008 | Olson et al. |
| 2008/0126794 A1 | 5/2008 | Wang et al. |
| 2008/0126801 A1 | 5/2008 | Lee et al. |
| 2008/0263215 A1 | 10/2008 | Schnellbaecher |
| 2008/0307219 A1 | 12/2008 | Karandikar |
| 2009/0013399 A1 | 1/2009 | Cottrell et al. |
| 2009/0070841 A1 | 3/2009 | Buga et al. |
| 2009/0073943 A1* | 3/2009 | Krishnaswamy ..... H04W 88/04 370/338 |
| 2009/0083537 A1 | 3/2009 | Larsen et al. |
| 2009/0083538 A1 | 3/2009 | Merugu et al. |
| 2009/0089862 A1 | 4/2009 | Sun |
| 2009/0113537 A1 | 4/2009 | Woo |
| 2009/0119504 A1 | 5/2009 | van Os et al. |
| 2009/0132807 A1 | 5/2009 | Schneider |
| 2009/0138577 A1 | 5/2009 | Casado et al. |
| 2009/0144408 A1 | 6/2009 | Wilf et al. |
| 2009/0220080 A1 | 9/2009 | Herne et al. |
| 2010/0031042 A1 | 2/2010 | Di Crescenzo et al. |
| 2010/0031337 A1 | 2/2010 | Black et al. |
| 2010/0037311 A1 | 2/2010 | He et al. |
| 2010/0049970 A1 | 2/2010 | Fraleigh et al. |
| 2010/0071048 A1 | 3/2010 | Novak et al. |
| 2010/0115581 A1 | 5/2010 | Goldschlag et al. |
| 2010/0242097 A1 | 9/2010 | Hotes et al. |
| 2010/0242106 A1* | 9/2010 | Harris ..................... H04L 63/08 726/15 |
| 2010/0299525 A1 | 11/2010 | Shah et al. |
| 2010/0325419 A1 | 12/2010 | Kanekar |
| 2011/0231649 A1 | 9/2011 | Bollay et al. |
| 2011/0231651 A1 | 9/2011 | Bollay |
| 2011/0231652 A1 | 9/2011 | Bollay et al. |
| 2011/0231653 A1 | 9/2011 | Bollay et al. |
| 2011/0231655 A1 | 9/2011 | Bollay et al. |
| 2011/0231923 A1 | 9/2011 | Bollay et al. |

FOREIGN PATENT DOCUMENTS

| | | | |
|---|---|---|---|
| JP | 2001-333110 | A | 11/2001 |
| KR | 10-2006-0062356 | A | 6/2006 |
| WO | 0103398 | A2 | 1/2001 |
| WO | 0137068 | A2 | 5/2001 |
| WO | 2004036360 | A2 | 4/2004 |
| WO | 2005001660 | A2 | 1/2005 |
| WO | 2005060202 | A1 | 6/2005 |
| WO | 2007021483 | A2 | 2/2007 |

OTHER PUBLICATIONS

Official Communication for U.S. Appl. No. 14/851,783 mailed on Mar. 11, 2016, 5 pages.
"BIG-IP e-Commerce Solutions Guide, version 4.5," F5 Networks, Feb. 27, 2010, 58 pages.
"BIG-IP Reference Guide, version 4.5," F5 Networks, Feb. 27, 2010, 43 pages.
"BIG-IP Solutions Guide, version 4.5," F5 Networks, Feb. 23, 2010, 36 pages.
"Kerberos: The Network Authentication Protocol," MIT.edu, first released Feb. 24, 2000, 2 pages http://web.mit.edu/Kerberos.
"Kerberos (protocol)," Wikipedia.org, initially published Feb. 25, 2002, 5 pages http://en.wikipedia.org/wiki/Kerberos_(protocol).
"Integrated Windows Authentication (IIS 6.0)," Microsoft TechNet, Jun. 23, 2003, 3 pages http://www.microsoft.com/technet/prodtechnol/WindowsServer2003/Library/IIS/523ae943-5e6a-4200-9103-9808baa00157.mspx?mfr=true.
"Manual: BIG-IP Reference Guide v4.6.2," F5 Networks, Feb. 23, 2010, 13 pages.
"Manual Chapter: BIG-IP version 4.6.2 Reference Guide. SSL Accelerator Proxies," F5 Networks, Feb. 23, 2010, 46 pages.
"Microsoft NTLM," Microsoft, Inc., build date Jul. 16, 2013, 2 pages http://msdn.microsoft.com/en-us/library/aa378749.aspx.
"NTLM," Wikipedia.org, initially published Feb. 12, 2006, 5 pages http://en.wikipedia.org/wiki/NTLM.
"OpenSSL—Welcome to the OpenSSL Project," The OpenSSL Project, 2005, 1 page.
"Release Note: BIG-IP Controller 4.5," F5 Networks, Oct. 30, 2002, 16 pages.
"Release Note: BIG-IP Version 4.6.2 Release Note," F5 Networks, Mar. 5, 2007, 36 pages.
Christensen, J. M., "Kerberos in a Sharepoint Environment," WindowSecurity.com, Jul. 30, 2008, 6 pages http://www.windowsecurity.com/articles/Kerberos-Sharepoint-Environment.html.

(56) References Cited

OTHER PUBLICATIONS

Dierks, T. et al., "The Transport Layer Security (TLS) Protocol, Version 1.2," RFC 5246, Network Working Group, Aug. 2008, 104 pages.
Glass, E., "The NTLM Authentication Protocol and Security Support Provider," SourceForge.net, 2003, 96 pages http://davenport.sourceforge.net/ntlm.html.
Malkhi, D. et al., "Fairplay—A Secure Two-Party Computation System" Proceedings of the 13th USENIX Security Symposium, Aug. 9-13, 2004, 22 pages.
Pfitzmann, B. et al., "A Model for Asynchronous Reactive Systems and its Application to Secure Message Transmission," Proceedings of the 2001 IEEE Symposium on Security and Privacy, May 2001, 17 pages.
Reid, B. et al., "Improving the Performance of IIS 6.0 Applications," TechNet Blogs, The Industry Insiders, Jul. 15, 2005, 3 pages http:/blogs.technet.com/b/industry_insiders/archive/2005/07/15/407751.aspx.
Tschalär, R. et al., "NTLM Authentication Scheme for HTTP," Jun. 17, 2003, 5 pages http://www.innovation.ch/personal/ronald/ntlm.html.
Zhu et al., "Splendor: A Secure, Private, and Location-aware Service Discovery Protocol Supporting Mobile Services," Proceedings of the First IEEE International Conference on Pervasive Computing and Communication (PerCom'03), Mar. 2003, pp. 235-242.
Official Communication for U.S. Appl. No. 12/848,096 mailed Jul. 9, 2013.
Official Communication for U.S. Appl. No. 13/052,005 mailed Jul. 16, 2013.
Official Communication for U.S. Appl. No. 11/420,677 mailed Apr. 25, 2012.
Official Communication for U.S. Appl. No. 12/848,096 mailed Nov. 30, 2012.
Official Communication for U.S. Appl. No. 12/846,778 mailed Aug. 7, 2012.
Official Communication for U.S. Appl. No. 12/967,006 mailed Apr. 9, 2013.
Official Communication for U.S. Appl. No. 11/420,677 mailed Jun. 6, 2013.
Freier, A. O. et al., "The SSL Protocol, Version 3.0," Nov. 18, 1996, 63 pages.
Official Communication for U.S. Appl. No. 11/420,677 mailed Sep. 14, 2012.
Official Communication for U.S. Appl. No. 12/846,778 mailed Sep. 16, 2013.
Official Communication for U.S. Appl. No. 13/051,963 mailed Sep. 26, 2013.
International Search Report and Written Opinion for International Patent Application No. PCT/US2011/029079 mailed Oct. 31, 2011.
International Preliminary Report on Patentability for International Patent Application No. PCT/US2011/029079 mailed Oct. 4, 2012.
Official Communication for U.S. Appl. No. 13/052,005 mailed Feb. 1, 2013.
Official Communication for U.S. Appl. No. 13/051,994 mailed Mar. 14, 2013.
"Application Switching Scaling Next-Generation Network," White Paper, Nortel Networks, Jan. 2008, 7 pages.
"RSA Security Certifies Array SSL Security Proxy and Integrated Web Traffic Manager, Array Products First in Class to received RSA BSAFE SSL-C Certification; Array Products to Include RSA BSADE Cert-C Certificate Management Software," MZ Presswire, Goliath, Oct. 21, 2002, 2 pages.
"Introduction to Secure Sockets Layer," White Paper, Cisco Systems, Feb. 2003, 12 pages.
Lesniewski-Laas, C. et al., "SSL Splitting: Securely Serving Data from Untrusted Caches," 2003, 13 pages http://web.mit.edu/golem.Public/barnraising;usenix-security-2003.pdf.
Yaping, Y. et al., "Design and Implementation of SSL Based Secure Transmission System," Journal of Beijing University of Aeronautics and Astronautics, vol. 4, No. 27, Aug. 2001, 1 page.
"AARNet: Network: Large MTU: Programming—Nagle algorithm," accessed Dec. 9, 2005 3 pages www.aarnet.edu.ay.engineering/networkdesign/mtu/programming.html.
Tormasov, A. et al., "TCP/IP Options for High-Performance Data Transmission," Builder.com, accessed Dec. 9, 2005, 4 pages http://builder.com.com/5100-6372-1050878.html.
"Wireless/Networking—Nagle algorithm," About.com, accessed Dec. 6, 2005, 2 pages http://componentnetworking.about.com/od/tcpip/l/bldel_nagel.htm.
"Manpages—TCP," Section—Linux Programmer's manual (7), Apr. 25, 1999, accessed Dec. 9, 2005, 6 pages www.fifi.org/cgi_bin/man2html/usr/share/man/man7/tcp.7.gz.
Nagle, J., "RFC 896—Congestion Control in IP/TCP Internetworks," Jan. 6, 1984, 13 pages www.faqs.org/rfcs/rfc896.html.
"PKCS #1 v2.0: RSA Cryptography Standard," RSA Laboratories, Oct. 1, 1998, pp. 1-35.
Berners-Lee, T. et al., "Hypertext Transfer Protocol—HTTP/1.0," RFC 1945, Network Working Group, May 1996, 60 pages.
Fielding, R. et al., "Hypertext Transfer Protocol—HTTP/1.0," RFC 1945, Network Working Group, May 1996, 60 pages.
Kessler, G. et al., "A Primer on Internet on TCP/IP Tools," RFC 1739, Network Working Group, Dec. 1994, 46 pages.
Paxson, V. et al., "Know TCP Implementation Problems," RFC 2525, Network Working Group, Mar. 1999, 61 pages.
"Nagle's algorithm—a Whatis.com definition," Nagle's Algorithm, accessed Dec. 6, 2005, 3 pages searchnetworking.techtarget.com/sdefinition/0.,sid7gci754347.00.html.
Official Communication for U.S. Appl. No. 12/848,096 mailed Aug. 7, 2015.
"HTTP/1.1 and Nagle's Algorithm," W3C, w3.org, accessed Dec. 6, 2005, 3 pages http://www.w3.org/Protocols/HTTP/Performance/Nagle.
Office Communication for U.S. Appl. No. 11/420,677 mailed Jul. 16, 2009.
Office Communication for U.S. Appl. No. 11/420,677 mailed Jan. 28, 2010.
Office Communication for U.S. Appl. No. 11/420,677 mailed Apr. 12, 2010.
Office Communication for U.S. Appl. No. 11/420,677 mailed Nov. 9, 2010.
Office Communication for U.S. Appl. No. 11/420,677 mailed Jun. 15, 2011.
Office Communication for U.S. Appl. No. 13/052,005 mailed on Mar. 30, 2015.
Office Communication for U.S. Appl. No. 12/848,096 mailed on Mar. 13, 2015.
Office Communication for U.S. Appl. No. 13/051,994 mailed on Feb. 26, 2015.
Office Communication for Japanese Application No. 2013-501341 mailed on Dec. 15, 2014.
SSLVPN Vulnerabilities—Client Certificates offer a superior defense over OTP devices, http://www.networkworld.com/community/node/31124, Apr. 6, 2010, 5 pages.
Hess et al., "Advanced Client/Server Authentication in TLS," in Proceedings of the Network and Distributed System Security Symposium (NDSS), 2002, 12 pages.
Office Communication for U.S. Appl. No. 13/052,005 mailed on Dec. 19, 2014.
Office Communication for U.S. Appl. No. 12/848,096 mailed on Dec. 18, 2014.
Office Communication for U.S. Appl. No. 13/051,963 mailed on Feb. 2, 2015.
Official Communication for U.S. Appl. No. 13/051,963 mailed Mar. 17, 2014.
Official Communication for U.S. Appl. No. 13/051,994 mailed Oct. 9, 2014.
Rescorla, E., "SSL and TLS—Design and Building Secure Systems," Addison-Wesley, Mar. 2001, pp. 175-217.

(56) References Cited

OTHER PUBLICATIONS

Mittra, S., "Iolus: A Framework for Scalable Secure Multicasting," Proceedings of the ACM SIGCOMM '97, Sep. 14-18, 1997, 12 pages.
Rescorla, E., "Datagram Transport Layer Security," RFC 4347, Network Working Group, Apr. 2006, 26 pages.
Official Communication for U.S. Appl. No. 12/967,006 mailed Sep. 17, 2012.
Official Communication for U.S. Appl. No. 12/846,778 mailed Nov. 23, 2012.
Official Communication for U.S. Appl. No. 13/051,994 mailed Nov. 21, 2012.
Official Communication for U.S. Appl. No. 11/420,677 mailed Nov. 6, 2013.
Official Communication for U.S. Appl. No. 12/967,006 mailed Nov. 19, 2013.
Official Communication for U.S. Appl. No. 13/052,005 mailed Nov. 27, 2013.
Martin, Franck, "SSL Certificates HOWTO,", pp. 1-36, Oct. 20, 2002, URL: http://www.tldp.org/HOWTO/SSL-Certificates-HOWTO/ (Mar. 14, 2003).
SiteCelerate Whitepaper—pp. 1-9, 2005, http://www.arahe.com/webaccelerate/sc_wp.pdf.
Cisco Whitepaper—"Cisco Application Networking for IBM WebSphere", pp. 1-10, 1992-2007, https://www.cisco.com/application/pdf/en/us/guest/netsol/ns432/c649/ccmigration_09186a0080908167.pdf.
Official Communication for U.S. Appl. No. 12/848,096 mailed Jun. 20, 2014.
Official Communication for U.S. Appl. No. 13/051,894 mailed May 22, 2014.
Official Communication for U.S. Appl. No. 12/967,006 mailed Aug. 25, 2014.
Official Communication for U.S. Appl. No. 11/420,677 mailed Mar. 12, 2014.
Official Communication for U.S. Appl. No. 13/051,963 mailed Jun. 27, 2014.
Official Communication for U.S. Appl. No. 12/846,778 mailed Jan. 31, 2014.
Official Communication for U.S. Appl. No. 13/052,005 mailed Jun. 30, 2014.
Official Communication for U.S. Appl. No. 13/051,963 mailed Oct. 17, 2014.
Rescorla et al. "SSLACC: A Clustered SSL Accelerator", Proceedings of the 11th USENIX Security Symposium, San Francisco, CA Aug. 2001 (18 pages).
Official Communication for U.S. Appl. No. 13/779,530 mailed Aug. 6, 2014.
Official Communication for U.S. Appl. No. 13/779,530 mailed Nov. 17, 2014.
Office Communication for U.S. Appl. No. 13/051,963 mailed on Feb. 23, 2015.
Office Communication for U.S. Appl. No. 13/779,530 mailed on Mar. 2, 2015.
Supplementary EP Search Report for Application EP 11757098 mailed Jun. 12, 2015.
Office Communication for U.S. Appl. No. 13/051,963 mailed on Jun. 8, 2015.
Office Communication for U.S. Appl. No. 13/779,530 mailed on Jun. 17, 2015.
Office Communication for U.S. Appl. No. 12/967,006 mailed on Jul. 1, 2015.
Office Communication for U.S. Appl. No. 13/051,994 mailed on Jun. 22, 2015.
Official Communication for U.S. Appl. No. 14/791,129 mailed Jun. 10, 2016, 13 pages.
Official Communication for U.S. Appl. No. 12/967,006 mailed on Aug. 4, 2016, 9 pages.
Official Communication for U.S. Appl. No. 14/851,783 mailed Oct. 24, 2016, 18 pages.
Official Communication for U.S. Appl. No. 14/791,129 mailed on Jan. 6, 2017, (12 pages).
Office Communication for U.S. Appl. No. 14/320,331 mailed on Dec. 16, 2016, 15 pages.

\* cited by examiner

PROXY SSL AUTHENTICATION IN SPLIT SSL FOR CLIENT-SIDE PROXY AGENT RESOURCES WITH CONTENT INSERTION

CROSS REFERENCE TO RELATED APPLICATION

This Utility Patent Application is a Continuation of U.S. patent application Ser. No. 13/779,530, filed on Feb. 27, 2013, which is a Continuation of U.S. patent application Ser. No. 12/846,778, filed on Jul. 29, 2010, now U.S. Pat. No. 8,700,892, issued on Apr. 15, 2014, which claims the benefit of U.S. Provisional Application Ser. No. 61/315,857, filed on Mar. 19, 2010, titled "Proxy SSL Handoff Via Mid-Stream Renegotiation," the benefits of which are claimed under 35 U.S.C. §120 and §119(e), and which are further incorporated by reference in their entireties.

TECHNICAL FIELD

The present invention relates generally to managing network communications, and more particularly, but not exclusively, to enabling a dedicated authentication server to validate a client by way of a strongly encrypted connection to the client, and redirecting task traffic from the client to another server over another connection.

TECHNICAL BACKGROUND

An increasing number of applications within an enterprise are provided over Hypertext Transfer Protocol (HTTP). Many of these applications provide secure communications between a client device and a hosted website. These applications include intranet portals, Webmail, front-office applications, back-office applications, and the like. Many of these applications may also be accessed from a branch office either through a Virtual Private Network (VPN) tunnel, directly over the public Internet, or the like. These applications may be available on a server device inside a head office, for example. The head office and branch office include networks of computing devices secured behind security perimeters, such as behind firewalls, or the like.

A traditional method of providing secure communications between the client device and the server device employs a web browser and a website to establish an encrypted session. Encrypted sessions may be implemented using a variety of secure communication protocols, including Secure Sockets Layer (SSL) protocol, Transport Layer Security (TLS) protocol, or the like. Managing such an encrypted session may be difficult at times, especially where the server device may not have information needed by the client device, the server device fails, or the server device otherwise needs to be replaced with a different server device.

Moreover, in systems where client validation is requested (e.g. in a two-way SSL connection in which both the client and server are validated), a heavy load may be placed on a server if it handles task traffic for the connection (e.g. content requests from the client) as well as performing authentication, authorization and accounting (AAA) tasks, including but not limited to client certificate authentication.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the described embodiments, reference will be made to the following Detailed Description, which is to be read in association with the accompanying drawings, wherein.

DETAILED DESCRIPTION

Figure 1:
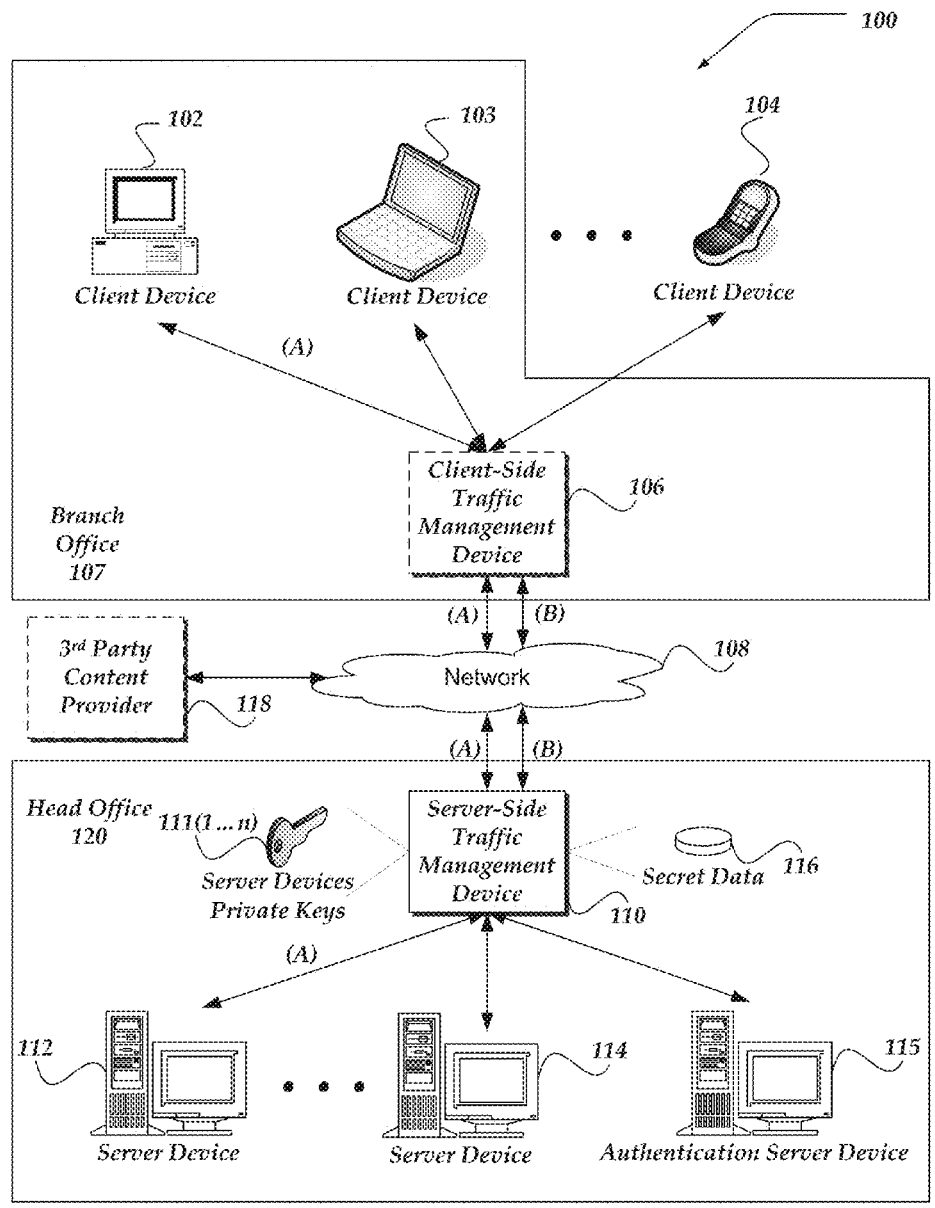
FIG. 1 illustrates a functional block diagram illustrating an environment for practicing various embodiments.

In the following detailed description of exemplary embodiments, reference is made to the accompanied drawings, which form a part hereof, and which show by way of illustration examples by which the described embodiments may be practiced. Sufficient detail is provided to enable those skilled in the art to practice the described embodiments, and it is to be understood that other embodiments may be utilized, and other changes may be made, without departing from the spirit or scope. Furthermore, references to "one embodiment" are not required to pertain to the same or singular embodiment, though they may. The following detailed description is, therefore, not to be taken in a limiting sense, and the scope of the described embodiments is defined only by the appended claims.

Throughout the specification and claims, the following terms take the meanings explicitly associated herein, unless the context clearly dictates otherwise. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, application layer refers to layers 5 through 7 of the seven-layer protocol stack as defined by the ISO-OSI (International Standards Organization-Open Systems Interconnection) framework.

The term "network connection" refers to a collection of links and/or software elements that enable a computing device to communicate with another computing device over a network. One such network connection may be a Transmission Control Protocol (TCP) connection. TCP connections are virtual connections between two network nodes, and are typically established through a TCP handshake protocol. The TCP protocol is described in more detail in Request for Comments (RFC) 793, available from the Internet Engineering Task Force (IETF), and is hereby incorporated by reference in its entirety. A network connection "over" a particular path or link refers to a network connection that employs the specified path or link to establish and/or maintain a communication. The term "node" refers to a network element that typically interconnects one or more devices, or even networks.

As used herein, including the claims, the term "SSL" refers to SSL, TLS, Datagram Transport Layer Security (DTLS) and all secure communications protocols derived therefrom. The SSL protocol is described in Netscape Communications Corp, *Secure Sockets Layer (SSL) version 3* (November 1996), and the TLS protocol is derived from SSL, and is described in Dierks, T., and Allen, C., "The TLS Protocol Version 1.0," RFC 2246 (January 1999), available from the IETF. The DTLS protocol is based on the TLS protocol, and is described in Rescorla, E., and Modadugu, N., "Datagram Transport Layer Security," RFC 4347 (April 2006), available from the IETF. Each of these documents is incorporated herein by reference in their entirety. An SSL connection is a network connection that is secured by cryptographic information derived from an SSL protocol. The SSL protocol operates between an application layer (such as one or more of OSI layers 5-7) and a transport layer (such as OSI layer 4). The SSL protocol may provide security for application layer protocols such as HyperText Transfer Protocol (HTTP), Lightweight Directory Access Protocol (LDAP), Internet Messaging Access Protocol (IMAP), or the like. For example, HTTP over SSL (HTTPS) utilizes the SSL protocol to secure HTTP data. The SSL protocol may utilize Transport Control Protocol/Internet Protocol (TCP/IP) on behalf of the application layer protocols to transport secure data. The SSL protocol may also employ a certificate. In one embodiment, the certificate is an X.509 certificate, such as those described in RFC 2459, available from the IETF, which is also incorporated herein by reference.

As used herein, including the claims, the terms "authentication server" and "authentication server device" refer to a server configured to perform one or more of AAA functions related to a network connection with a client device. For example, an authentication server may validate a client device by authenticating its certificate during the establishment of an SSL session between the client and the authentication server. Authentication server may refer to a single authentication server device, or a plurality of authentication server devices in a cluster, cloud or farm of authentication servers. Such a plurality of authentication servers may be load-balanced to provide more reliable and efficient AAA operations for a plurality of network connections and/or client devices.

As used herein, an SSL session refers to a secure session over a network between two endpoints, secured using the SSL protocol. Although an SSL session is generally described herein as being established between a client and a server over a network, it should be understood that an SSL session may be established between virtually any types of network devices enabled to employ the SSL protocol. The SSL protocol uses a series of SSL handshakes (i.e. an SSL handshake protocol) to initiate an SSL session. An SSL session is associated with a master secret that results from the SSL handshakes. An SSL session is further associated with additional secret data that enables the SSL session (e.g. pre-master secret, the random data used to generate the pre-master secret, server's public and private keys and/or client's public and private keys). The SSL protocol also includes an SSL re-handshake procedure for renegotiating an SSL session. The renegotiated SSL session may be associated with the current SSL session or with another SSL session. An SSL session may employ one or more underlying network connections. As used herein, the term SSL connection refers to such a network connection employed by an SSL session.

Briefly, SSL supports at least four content types: application_data, alert, handshake, and change_cipher_spec. Alert, handshake, and change_cipher_spec content types are associated with messages for managing the SSL protocol. For example, an SSL alert is of the alert content type and is used for signaling, among other things, error conditions. SSL has provisions for other content types, but these capabilities are not commonly used.

The SSL handshake protocol includes the exchange and processing of a series of messages, which may be one of an alert, handshake, and/or change_cipher_spec content type. One or more SSL handshake messages are encapsulated within one or more network records of the handshake content type. The SSL handshake message also includes an associated SSL handshake type, and one or more data fields.

The SSL handshake protocol typically begins with the client device sending to the server device, among other things, randomly generated data within a CLIENT-HELLO message (e.g. an SSL handshake message with an associated SSL handshake type of "CLIENT-HELLO"). The server device responds to the CLIENT-HELLO message with, among other things, randomly generated data within a SERVER-HELLO message. Further, the server may provide a server certificate which the client may use to authenticate the server. Moreover, in some embodiments the server may request a client certificate which the server may authenticate in order to validate the client.

The client device, using the randomly generated data exchanged in the CLIENT-HELLO and SERVER-HELLO messages, generates a pre-master secret for an SSL session. In one embodiment, the client device may also include another random number in the pre-master secret, one that has typically not been transmitted over a public network in the clear. The client device then sends the pre-master secret to the server device in an SSL handshake message. In one embodiment, the pre-master secret may be encrypted using a public key associated with the server (obtained from the server's SERVER-HELLO message). Typically, the SSL handshake message that includes the pre-master secret is a CLIENT-KEY-EXCHANGE handshake message. Each of the client device and the server device, separately, perform a series of steps to generate a master secret using the pre-master secret. This master secret is associated with the SSL session. Then, separately, each of the client device and the server device use the master secret to generate connection keys, which may include, but are not limited to, cipher keys used to encrypt and decrypt communicated data over the SSL session, and/or authentication keys used verify messages received over the SSL session. The client device and the server device may then use their respective instances of the connection key(s) to generate and send messages containing encrypted payloads to each other.

As used herein, including the claims, the term "encrypted session" refers to a communications session between two endpoint devices over a network, encrypted in some way so as to secure the session. Example encrypted sessions may include SSL, TLS, and DTLS sessions. As used herein, the term "encrypted connection" refers to any network connection secured by cryptographic information, such as SSL, TLS, and DTLS connections, although other encrypted connections are similarly contemplated. An encrypted connection includes cipher keys used to encrypt and decrypt data communicated over the encrypted connection, as well as a reference to an underlying transport protocol interface, such as a TCP interface.

As used herein, the phrase "encrypted session/connection" refers an encrypted session and/or an encrypted connection.

As used herein, the phrase "end-to-end encrypted session/connection" refers to an encrypted session and/or connection between two endpoint devices. In some instances, each endpoint device may know the identity of the other endpoint device when establishing the encrypted session/connection.

As used herein, the phrase "terminating an encrypted session" refers to being one of the two endpoints of an encrypted session. Similarly, the phrase "terminating an encrypted connection" refers to being one of the two endpoints of an encrypted connection. The endpoints of an encrypted session or connection are devices, such as a client device and a server device, between which encrypted data may be transmitted. Examples of a client device and a server device are an SSL client and an SSL server. As used herein, the phrase "encrypted session/connection client" refers to a client device, and the phrase "encrypted session/connection server" refers to a server device.

As used herein, the phrase "establishing an encrypted session" refers to participating in an encrypted session handshake protocol. The phrase "establishing an encrypted connection" refers to generating an encrypted connection associated with an encrypted session based on the encrypted session's session key (also known as the encrypted session's master key). In one embodiment, two devices establish the encrypted session/connection, becoming the endpoints of the encrypted session/connection. Additional devices also may optionally participate in establishing the encrypted session/connection, either in conjunction with one or both of the endpoints, or without the knowledge of one or both endpoints. One example of an encrypted session handshake protocol is an SSL handshake protocol.

As used herein, the phrase "out-of-band" refers to sending data outside of a current encrypted session/connection, such as sending the data over a connection distinct from an end-to-end encrypted session/connection established between a client device and a server device, operating as endpoints.

As used herein, the phrase "secret data" refers to data that enables an encrypted session handshake between two devices. Secret data includes, for example, a master secret and a pre-master secret as described in RFC 2246, referenced above. Secret data may also include the random data employed to generate the pre-master secret, nonces, PKI private keys for server and/or client, and the like.

As used herein, the term "packet" refers to a group of binary digits which is switched and transmitted as a composite whole. A "network packet" is a packet that is switched and transmitted over a network from a source toward a destination. As used herein, the terms "packet header" and "header" refer to contiguous bits at the start of a packet that carry information about the payload data of the packet. For example, a header may include information regarding a format, protocol, source, destination, type, and/or sequence of payload data in a packet, and/or any other type of control information necessary for the sending, receiving and/or processing of the payload data in a packet. As used herein, "packet payload" and "payload" refer to data included within a packet, and distinct from a packet header of the packet. The payload may include data that is to be transferred from source toward a destination, and such data may be in a particular format described in the header.

Identification of header and payload within a packet may be context relevant, and related to a relevant layer of the OSI stack. For example, a packet may be analyzed by a lower-level process operating at a lower level of the OSI stack, such as the transport layer. Such a lower-level process may identify a transport-layer header and transport-layer payload within the packet, and may strip the transport-layer header from the packet in the course of receiving and analyzing the packet. The identified payload data from the packet may then be transferred to a higher-level process operating at a higher level of the OSI stack, such as at the application layer, which may identify an application layer header and application layer payload within the transferred data. Thus, both header and payload relevant to a higher level of processing (e.g. application layer) may be included in payload data relevant to a lower level of processing (e.g. transport layer).

Throughout this disclosure, when specific message types are listed, such as "CLIENT-HELLO", it is understood that these are examples used to illustrate a type of message. These specific messages are but one embodiment, and other similar messages used to establish and/or maintain an encrypted session/connection are similarly contemplated.

Briefly described is a mechanism for re-establishing an encrypted connection, causing an encrypted connection that had terminated at a client device and a first server device to be to terminate at the client device and a second server device. As a skilled artisan will appreciate, encrypted sessions such as SSL sessions, and any encrypted connections associated with an encrypted session, are designed to secure the identity of each endpoint for the duration of the session/connection. Thus, disclosed embodiments that enable an endpoint of an established encrypted connection to be replaced are here-to-now unexpected.

As described, a TMD is interposed between the client device and the first server device. During establishment of an end-to-end encrypted session/connection between the client device and first server device, the interposed TMD accesses secret information about the encrypted session/connection. Such information includes, for example a pre-master secret usable to determine connection keys for encrypting and decrypting data transmitted across encrypted connections within the end-to-end encrypted session. By accessing the secret information for the end-to-end encrypted session/connection, the TMD is able to read, intercept, augment, delete, delay, prune, compress, enhance, accelerate, transpose, or otherwise modify data sent over the encrypted connection.

In some embodiments, the TMD may transmit, to the client device, a request to renegotiate an end-to-end encrypted connection. The renegotiation request may include, for example, an SSL HELLO REQUEST message. From the perspective of the client device, it appears as though the first server device has asked the client device to renegotiate the existing encrypted connection—the client device is typically unaware that the TMD initiated the renegotiation. In response to the renegotiation request, the client device may transmit, over the encrypted connection, a CLIENT HELLO message addressed to the first server device. In one embodiment, the TMD may intercept the CLIENT HELLO message, decrypt it, and redirect it towards the second server device. Subsequent messages transmitted by the client device may be similarly redirected towards the second server device. As a result, from the perspective of the client device, the original encrypted connection has been re-established with the second server device. From the perspective of the first server device, its encrypted connection with the client device may have ended. From the perspective of the TMD, an existing encrypted connection between the client device and the first server device has been replaced with a new encrypted connection between the client device and the second server device. In one embodiment, the client device is unaware that it shares an encrypted connection with a different server. Additionally or alternatively, if one or more client certificates or server certificates are included in or with the encrypted session handshake messages, these certificates may be used by the client and server to authenticate the identity of each other, thus preserving the trust relationship that would exist if the TMD had not been inserted between the client and server.

In one embodiment, the TMD discussed above is a server-side TMD, and the server-side TMD may be used in conjunction with a client-side TMD to enhance or otherwise modify data transmitted between one or more client devices and one or more server devices. In one embodiment, the client-side TMD may not be interposed directly between a client device and a server device, making some optimizations difficult. In this embodiment, the client-side TMD may utilize a Border Gateway Protocol (BGP) to cause internet routers to route traffic addressed to the server device through the client-side TMD, for example, by broadcasting BGP route availability announcements to announce that the TMD is available to provide connectivity to certain network addresses (e.g. address(es) associated with the server device). In this way, the client-side TMD is enabled to become inserted between the client and server devices and thereby enhance or otherwise modify data transferred between the client and server devices.

In some embodiments, a TMD may suspend its operations for decrypting, encrypting, and/or modifying intercepted traffic, either for a certain predetermined period of time or indefinitely. During such time, the TMD will effectively act as a router, routing but not modifying traffic. Such a suspension may occur for a variety of reasons. For example, the suspension may occur when the TMD no longer has the secret data (e.g. session key) needed to decrypt, encrypt and/or modify communications traffic. In some embodiments, the suspension may occur in response to an instruction received from an operator of the TMD, from a server device and/or other network device. In some embodiments, the TMD may end the suspension and resume its operations for decrypting, encrypting, and/or modifying data once it has recovered the necessary secret data to decrypt/encrypt the traffic, based on another instruction received from an operator, server, other network device, and the like, or based on other criteria.

In some embodiments, server-side TMD and client-side TMD may be distinguished by their relative positions within a system topology, and/or their physical locations. For example, as shown in FIG. 1, a client-side TMD may be closer to a client device physically (e.g. co-located within branch office 107 with client device(s)) and/or topologically (e.g. requiring relatively fewer network hops for traffic to reach a client device than a server device).

In one embodiment, a TMD may proxy one or more encrypted connections between a client device and a plurality of server devices by switching the server-side endpoint of an encrypted connection between the plurality of server devices based on HTTP request type, time of day, access policy information, or other criteria. In one embodiment, the TMD may be located in geographic proximity to the client device, while in another embodiment the TMD may be located in geographic proximity to the server device. Additionally or alternatively, a TMD may similarly proxy connections between a server device and a plurality of client devices based on HTTP request type, time of day, access policy information, or other criteria.

Moreover, in some embodiments a TMD interposed between a client and a server may perform operations to enhance system performance, redirect traffic, and the like, because the TMD has obtained the private key useable to decrypt traffic being sent during an encrypted session between the client and the server. For example, the TMD may be configured to monitor an end-to-end encrypted session established between a client device and an authentication server. Such an end-to-end encrypted session may include a two-way SSL session between the client and an authentication server, established through the client and authentication server each validating the other's certificate. Subsequent to an encrypted session being established between the client and the authentication server, the TMD may intercept traffic sent over the encrypted session, and forward at least some of the intercepted traffic to one or more other servers. Such traffic may be forwarded to the one or more other servers instead of or in addition to being sent to the authentication server. In some embodiments, such other servers may be servers configured to handle task traffic (e.g. content requests from a client).

In some embodiments, the server may be a particular server that is hosting one or more particular resources that the client has requested. In some embodiments, a client may be requesting general access to a plurality of servers prior to requesting a particular resource. In such cases, the TMD may function as a proxy to redirect traffic from the client to a network or sub-network connecting the plurality of servers, to enable the client to request resources hosted by one or more of the servers.

In some embodiments, the end-to-end encrypted session may employ a first connection between client and authentication server, and forwarding of traffic from the TMD to the one or more servers may take place over a second connection. In some embodiments, the second connection may be encrypted. For example, the second connection may enable an SSL session between the TMD and a server. Such a second SSL session may be encrypted using the same session key as the first connection between client and authentication server, or using a different session key In some embodiments, the second connection may be unencrypted, such that traffic is sent over the second connection in plaintext.

In some embodiments, the encrypted session between client and authentication server may be maintained while the TMD forwards traffic to one or more servers. This may enable the authentication server to suspend or stop the TMD from forwarding traffic to a server if the authentication server determines that the client is no longer trusted. In some embodiments, the authentication server may be configured to periodically send the TMD a message, token and/or some other indication that the client is still trusted. In some embodiments, the TMD may be configured to send a status message to the authentication server to instruct the authentication server to maintain its session with the client. In some embodiments, the TMD may be configured to forward intercepted traffic from the client to the authentication server, while forwarding at least some of the intercepted traffic to a server as well. In such cases, the forwarded traffic itself may indicate that the authentication server should maintain its session with the client.

Moreover, in some embodiments the authentication server, TMD and/or client may be enabled to trigger a renegotiation of the encrypted session between the client and authentication server. During such a renegotiation, the second connection between the TMD and a server may be suspended while the renegotiation takes place, and the TMD may resume forwarding traffic over the second connection once it determines that an encrypted session between the client and authentication server as been reestablished following a successful renegotiation. Such suspension during renegotiation is discussed further herein with regard to FIG. 11.

Illustrative Operating Environment

FIG. 1 shows components of an illustrative environment 100 in which the described embodiments may be practiced. Not all the components may be required to practice the described embodiments, and variations in the arrangement and type of the components may be made without departing from the spirit or scope of the described embodiments. FIG. 1 illustrates client devices 102-104, client-side TMD 106, branch office 107, network 108, server-side TMD 110, end-to-end encrypted session (A), secure tunnel (B) through network 108, private keys 111(1) through 111(n), server devices 112 through 114, authentication server device 115, secret data 116, third party content provider 118, and head office 120. Server devices 112-114 (server device 113 not shown) and authentication server device 115 are collectively referred to herein as server devices 112-115.

Generally, client devices 102-104 may include virtually any computing device capable of connecting to another computing device and receiving information. Client devices 102-104 may be located within the branch office 107, but client devices 102-104 may alternatively be located outside of branch office 107. Such devices may include personal computers, multiprocessor systems, microprocessor-based or programmable consumer electronics, network devices, and the like. Client devices 102-104 may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. As such, client devices 102-104 may range widely in terms of capabilities and features.

Client devices 102-104 may further include one or more client applications that are configured to manage various actions. Moreover, client devices 102-104 may also include a web browser application that is configured to enable an end-user to interact with other devices and applications over network 108.

Network 108 is configured to couple network enabled devices, such as client devices 102-104, TMDs 106 and 110, server devices 112-114, authentication server device 115, and third party content provider 118, with other network enabled devices. In one embodiment, client device 102 may communicate with server device 112 through client-side TMD 106, network 108, and server-side TMD 110. Additionally or alternatively, client device 102, client-side TMD 106, server-side TMD 110, and server device 112 may all be connected directly to network 108. In one embodiment, network 108 may enable encrypted sessions, such as end-to-end encrypted session (A), between client devices 102-104 and server devices 112-115.

Network 108 is enabled to employ any form of computer readable media for communicating information from one electronic device to another. In one embodiment, network 108 may include the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include fiber optics, twisted wire pair, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 108 may further employ a plurality of wireless access technologies including, but not limited to, 2nd (2G), 3rd (3G), 4th (4G) generation radio access for cellular systems, Wireless-LAN, Wireless Router (WR) mesh, and the like. Access technologies such as 2G, 3G, 4G, and future access networks may enable wide area coverage for network devices, such as client devices 102-104, or the like, with various degrees of mobility. For example, network 108 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link, a DSL modem, a cable modem, a fiber optic modem, an 802.11 (Wi-Fi) receiver, and the like. In essence, network 108 includes any communication method by which information may travel between one network device and another network device.

Secure tunnel (B) through network 108 includes any tunnel for communicating information between network devices. Typically, secure tunnel (B) is encrypted. As used herein, a "tunnel" or "tunneled connection" is a network mechanism that provides for the encapsulation of network packets or frames at a same or lower layer protocol of the Open Systems Interconnection (OSI) network stack. Tunneling may be employed to take packets or frames from one network system and place (e.g. encapsulate) them inside frames from another network system. Examples of tunneling protocols include, but are not limited to IP tunneling, Layer 2 Tunneling Protocol (L2TP), Layer 2 Forwarding (L2F), VPNs, IP SECurity (IPSec), Point-to-Point Tunneling Protocol (PPTP), GRE, MBone, and SSL/TLS. As shown, secure tunnel (B) is created for secure connections between client-side TMD 106 and server-side TMD 110 through network 108.

One embodiment of a network device that could be used as client-side TMD 106 or server-side TMD 110 is described in more detail below in conjunction with FIG. 2. Briefly, however, client-side TMD 106 and server-side TMD 110 each include virtually any network device that manages network traffic. Such devices include, for example, routers, proxies, firewalls, load balancers, cache devices, application accelerators, devices that perform network address translation, any combination of the preceding devices, or the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets.

In one embodiment, server-side TMD 110 is typically located within head office 120, and as such is considered to be physically secure and under the direct management of a central administrator. Accordingly, sever-side TMD 110 may also be known as a trusted TMD. Server-side TMD 110 may control, for example, the flow of data packets delivered to, or forwarded from, an array of server device devices, such as server devices 112-115. In one embodiment, messages sent between the server-side TMD 110 and the server devices 112-115 may be part of a secure channel, such end-to-end encrypted session (A) formed between one of client devices 102-104 and one of the server devices 112-115. In another embodiment, server-side TMD 110 may terminate an encrypted connection on behalf of a server device, and employ another type of encryption, such as IPSec, to deliver packets to or forward packets from the server device. Alternatively, when the server-side TMD 110 terminates the encrypted connection on behalf of a server device, delivering packets to or forwarding packets from the server device may be performed with no encryption (or "in the clear").

In one embodiment, client-side TMD 106 typically resides in branch office 107, physically outside the control of central administrators, and therefore may be subject to physical tampering. Accordingly, client-side TMD 106 may be known as an untrusted TMD. In one embodiment, client-side TMD 106 may forward data from a source to a destination. For example, client-side TMD 106 may forward one or more encrypted session handshake messages between one of client devices 102-104 and one of server devices 112-115. Alternatively, a client-side TMD may reside in the head office 120. Alternatively, a client-side TMD may be included with a server-side TMD in a single device, enabling a single device to provide the services of both a client-side TMD and a server-side TMD, based on the types and locations of devices transmitting data through the TMD. Alternatively or additionally, a TMD may act as both a client-side TMD and a server-side TMD for a single connection. For example, a TMD may act as a client-side TMD by routing a request to a server-side TMD in another office. However, the server-side TMD may re-route the request to a server device located in geographic proximity to the "client-side" TMD. In this case, the "client-side" TMD may connect the client device to the local server device. When connecting the client device to a local server device, the TMD that began as a "client-side" TMD may perform the role of a "server-side" TMD.

As described in more detail below, client-side TMD 106 may receive secret data 116, typically from server-side TMD 110, that enables it to perform various additional actions on encrypted connection messages sent between one of client devices 102-104 and one of server devices 112-115. For example, client-side TMD 106 may be enabled to read, intercept, augment, delete, prune, compress, delay, enhance, transpose, or otherwise modify data within an encrypted connection message.

In one embodiment, server device private keys 111 may be centralized inside of the head office 120, a Federal Information Processing Standard (FIPS) boundary, or the like. Server-side TMD 110 may be enabled to access the private keys 111, or the like, through a variety of mechanisms.

Server devices 112-115 may include any computing device capable of communicating packets to another network device. Each packet may convey a piece of information. A packet may be sent for handshaking, e.g., to establish a connection or to acknowledge receipt of data. The packet may include information such as a request, a response, or the like. Generally, packets received by server devices 112-115 may be formatted according to TCP/IP, but they could also be formatted using another protocol, such as SCTP, X.25, NetBEUI, IPX/SPX, token ring, similar IPv4/6 protocols, and the like. Moreover, the packets may be communicated between server devices 112-115, server-side TMD 110, and one of client devices 102-104 employing HTTP, HTTPS, and the like.

In one embodiment, server devices 112-115 are configured to operate as a website server. However, server devices 112-115 are not limited to web server devices, and may also operate a messaging server, a File Transfer Protocol (FTP) server, a database server, content server, and the like. Additionally, each of server devices 112-115 may be configured to perform a different operation. Thus, for example, server device 112 may be configured as a messaging server, while server device 114 is configured as a database server. Moreover, while server devices 112-115 may operate as other than a website, they may still be enabled to receive an HTTP communication.

Devices that may operate as server devices 112-115 include personal computers, desktop computers, multiprocessor systems, microprocessor-based or programmable consumer electronics, network PCs, server devices, and the like.

As discussed above, secret data 116 typically includes a pre-master secret and/or a master secret. Secret data 116 may also include random numbers, e.g. nonces (number used once). In one embodiment, a client device and a server device may exchange nonces in their respective HELLO messages, for use in generating the session key (also known as the master key). Additionally or alternatively, secret data 116 may include another nonce (distinct from the nonce's contained in HELLO messages) generated by the client device and digitally encrypted by the client device using the public key of the server device. In one embodiment, secret data 116 is utilized by one or more of the client device, server-side TMD 110, and the server device to generate a session key.

Third party content provider 118 may optionally be used to provide content, for example advertisements, to be inserted by server-side TMD 110 or client-side TMD 106 into an encrypted connection. However, third party content is not so limited, and may additionally include content provided by an affiliated business partner, a corporate IT department, and the like.

It is further noted that terms such as client and server may refer to functions within a device. As such, virtually any device may be configured to operate as a client, a server, or even include both a client and a server function. Furthermore, where two or more peers are employed, any one of them may be designated as a client or as a server, and be configured to confirm to the teachings of the present invention.

Illustrative Network Device Environment

Figure 2:
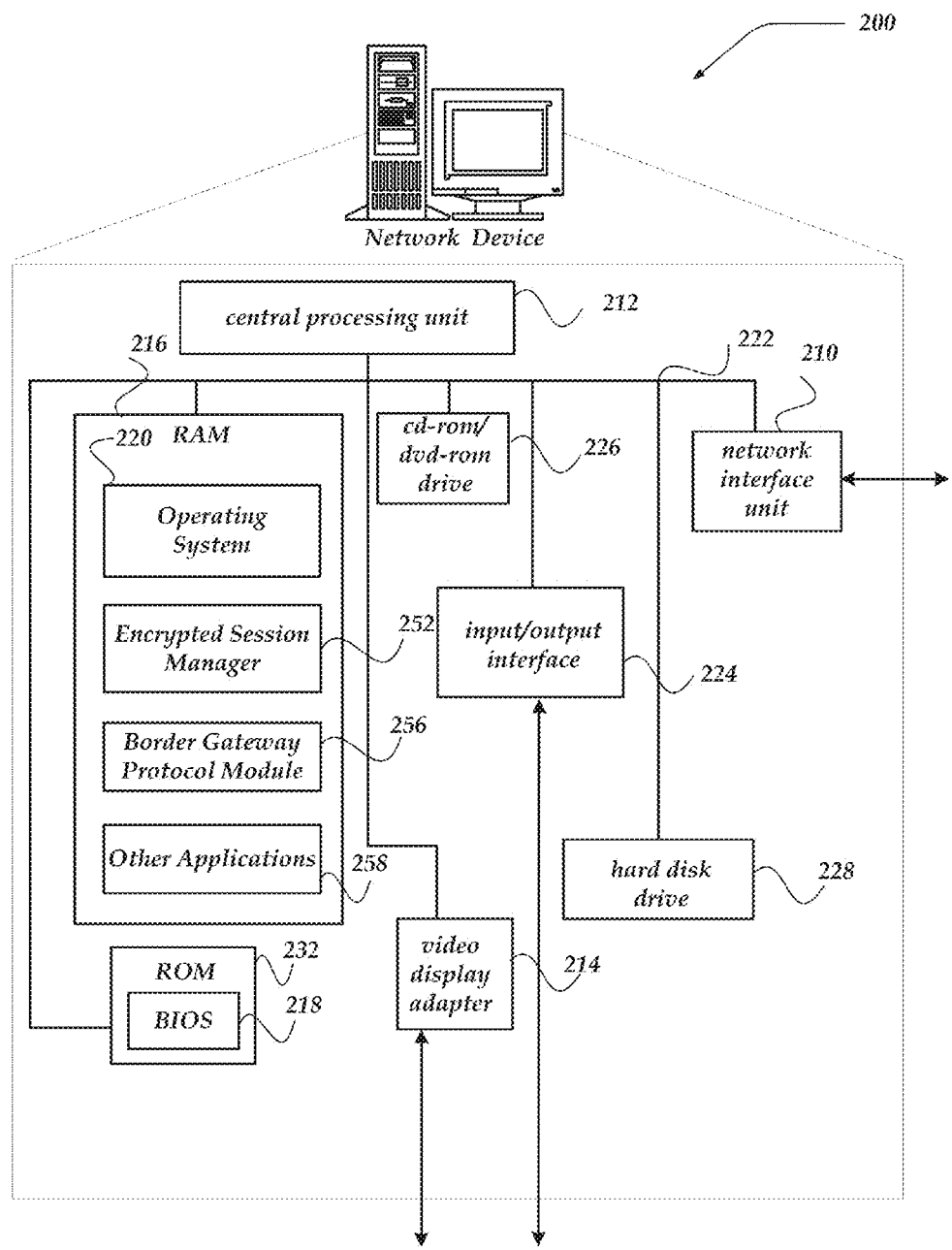
FIG. 2 illustrates one embodiment of a network device that may be included in a system implementing various embodiments.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may represent, for example, server-side TMD 110 and/or client-side TMD 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, CD-ROM/DVD-ROM drive 226, and/or floppy disk drive. The mass memory stores operating system 220 for controlling the operation of network device 200. Network device 200 also includes encrypted session manager 252, border gateway protocol (BGP) module 256, and other application 258.

As illustrated in FIG. 2, network device 200 also can communicate with the Internet, or some other communications network via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 258 are loaded into mass memory and run on operating system 220. Examples of application programs may include email programs, routing programs, schedulers, calendars, database programs, word processing programs, HTTP programs, traffic management programs, security programs, and so forth.

Network device 200 may further include applications that support virtually any secure connection, including TLS, TTLS, EAP, SSL, IPSec, and the like. Such applications may include, for example, encrypted session manager 252, and BGP protocol module 256.

In one embodiment, encrypted session manager 252 may perform encrypted session processing, including managing an encrypted session handshake, managing keys, certificates, authentication, authorization, or the like. Moreover, encrypted session manager 252 may in one embodiment establish encrypted sessions and/or connections, terminate encrypted sessions and/or connections, establish itself as a man-in-the-middle of an encrypted session and/or connection, or the like. Moreover, encrypted session manager 252 may in one embodiment initiate an encrypted connection renegotiation for the purpose of replacing the server endpoint of the encrypted session with another server endpoint.

Additionally, network device 200 may include applications that support a variety of tunneling mechanisms, such as VPN, PPP, L2TP, and so forth.

Network device 200 may also include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, certificates, public and private keys, secret data, and the like.

In one embodiment, the network device 200 includes at least one Application Specific Integrated Circuit (ASIC) chip (not shown) coupled to bus 222. The ASIC chip can include logic that performs some of the actions of network device 200. For example, in one embodiment, the ASIC chip can perform a number of packet processing functions for incoming and/or outgoing packets. In one embodiment, the ASIC chip can perform at least a portion of the logic to enable the operation of encrypted session manager 252 and/or BGP module 256.

In one embodiment, network device 200 can further include one or more field-programmable gate arrays (FPGA) (not shown), instead of, or in addition to, the ASIC chip. A number of functions of the network device can be performed by the ASIC chip, the FPGA, by CPU 212 with instructions stored in memory, or by any combination of the ASIC chip, FPGA, and CPU.

In one embodiment, some client devices, such as client device 102, may not be connected to client-side TMD 106 through a LAN or other direct connection. For example, client device 102 may not be located in a branch office having a client-side TMD. Additionally or alternatively, client device 102 may be a mobile device. When a client device is not directly connected to a client-side TMD, the client device may establish an encrypted session or otherwise transmit data to one of servers 112-115 without a client-side TMD to intercept and process the data. However, it is often beneficial for a client-side TMD to intercept and enhance such communication.

Towards this end, Border Gateway Protocol (BGP) module 256 may, in one embodiment, enable network traffic originating from one or more client devices to be routed through client-side TMD 106. In one embodiment, BGP module 256 ensures this routing by broadcasting a BGP protocol message to routers on the internet, the message indicating that client-side TMD 106 knows a best route for data addressed to server devices 112-115. As a result, routers having received the BGP protocol message typically may route network traffic addressed to one of server devices 112-115 through client-side TMD 106. As a result, client devices that are not directly connected to a client-side TMD may have their connections to server devices 112-115, including encrypted sessions, routed through a client-side TMD 106. In this way, client-side TMD 106 is enabled to perform various actions improving the efficiency of the network, for example compressing, accelerating, or otherwise modifying data.

Illustrative Server Device Environment

Figure 3:
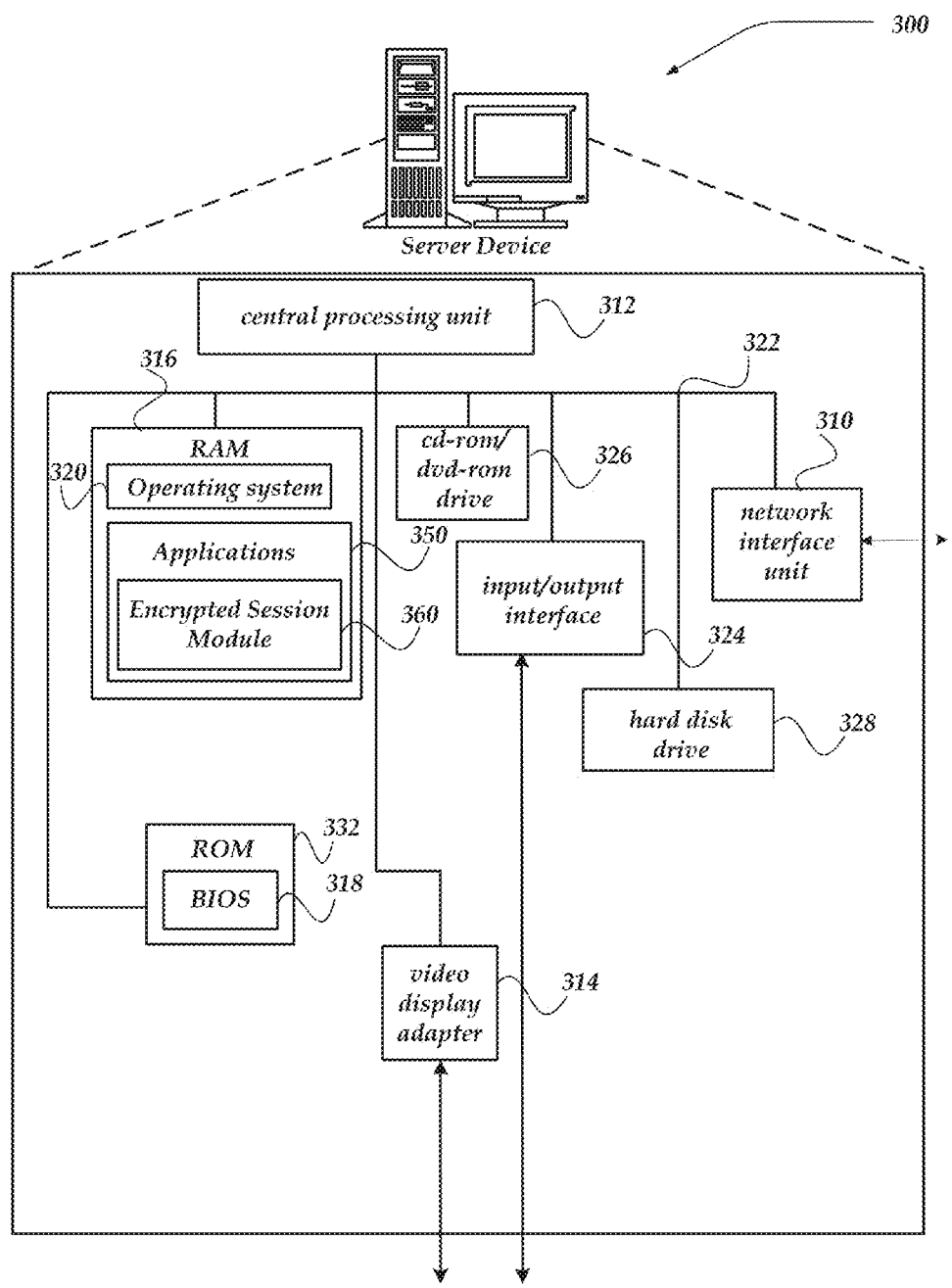
FIG. 3 illustrates one embodiment of a server device that may be included in a system implementing various embodiments.

FIG. 3 shows one embodiment of a server device, according to one embodiment of the invention. Server device 300 may include many more components than those shown. The components shown, however, are sufficient to disclose an illustrative embodiment for practicing the invention. Server device 300 may represent, for example, Servers 112-114 and Authentication Server 115 of FIG. 1.

Server device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, CD-ROM/DVD-ROM drive 326, and/or floppy disk drive. The mass memory stores operating system 320 for controlling the operation of server device 300. Any general-purpose operating system may be employed. Basic input/output system ("BIOS") 318 is also provided for controlling the low-level operation of server device 300. As illustrated in FIG. 3, server device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer-readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include encrypted session module 360. Encrypted session module 360 may establish encrypted sessions and/or connections with other network devices, including any of the network devices discussed above. In one embodiment, encrypted session module 360 may work cooperatively with TMD 110 or TMD 106 of FIG. 1. Additionally or alternatively, encrypted session module 360 may communicate with other network devices independent of any TMD.

Applications 350 may also include a variety of web services that are configured to provide content, including messages, over a network to another computing device. These web services include for example, a web server, messaging server, a File Transfer Protocol (FTP) server, a database server, a content server, or the like. These web services may provide the content including messages over the network using any of a variety of formats, including, but not limited to WAP, HDML, WML, SMGL, HTML, XML, cHTML, xHTML, or the like.

Generalized Operation

Figure 4:
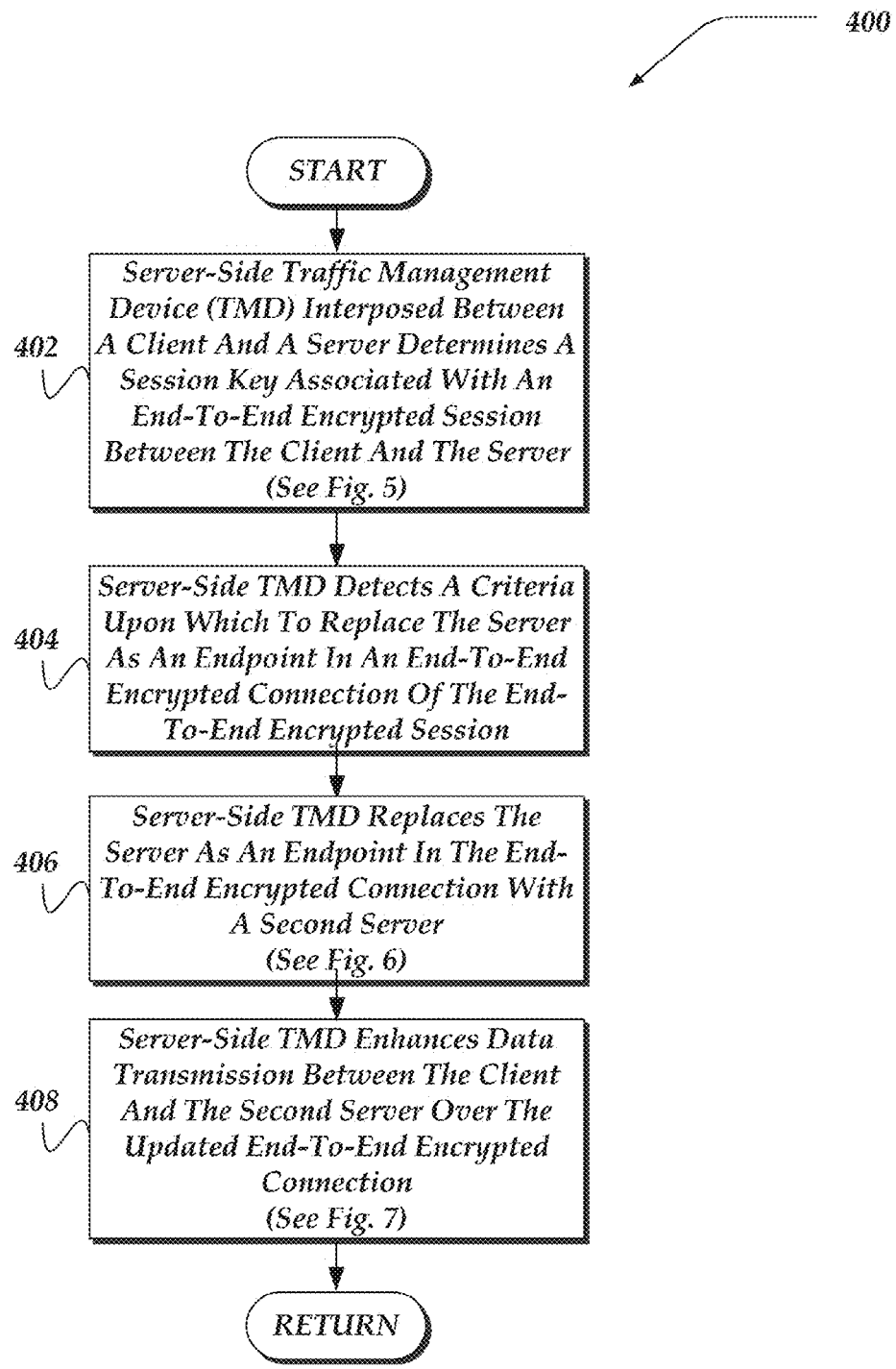
FIG. 4 illustrates a logical flow diagram generally showing one embodiment of an overview of a process for replacing an endpoint in an end-to-end encrypted connection.

The operation of certain aspects will now be described with respect to FIGS. 4-8. FIGS. 4-7 provide logical flow diagrams illustrating certain aspects, while FIG. 8 provides a signal flow diagram. FIG. 4 illustrates a logical flow diagram generally showing one embodiment of a process for replacing an endpoint in an end-to-end encrypted connection. In one embodiment, process 400 may be implemented by server-side TMD 110.

Process 400 begins, after a start block, at block 402, by a server-side TMD interposed between a client device and a first server device. In one embodiment, the server-side TMD determines a session key associated with an end-to-end encrypted session between the client device and the first server device. The determination of the session key is described in more detail below in conjunction with FIG. 5.

At block 404, the server-side TMD detects a criterion upon which to replace the first server device as an endpoint in an end-to-end connection associated with the end-to-end encrypted session. In one embodiment this detection criteria may include detecting a type of data requested by the client device. Additionally or alternatively the criteria may include a periodic schedule, a system upgrade of the server device, a request by an administrator, or the like.

At block 406, the server-side TMD replaces the first server device with a second server device as an endpoint in the encrypted connection. In one embodiment, the server-side TMD utilizes a renegotiation of the encrypted connection to establish the second server device as an endpoint. The replacement of the server device with the second server device is described in more detail below in conjunction with FIG. 6.

At block 408, the server-side TMD may read, intercept, delay, augment, delete, prune, compress, enhance, accelerate, transpose, or otherwise modify data sent over the encrypted connection. In one embodiment, the server-side TMD may work in conjunction with a client-side TMD to further enhance data transmitted over the encrypted connection. The enhancement of data transmitted over the encrypted connection is described in more detail below in conjunction with FIG. 7. The process then terminates at a return block.

Figure 5:
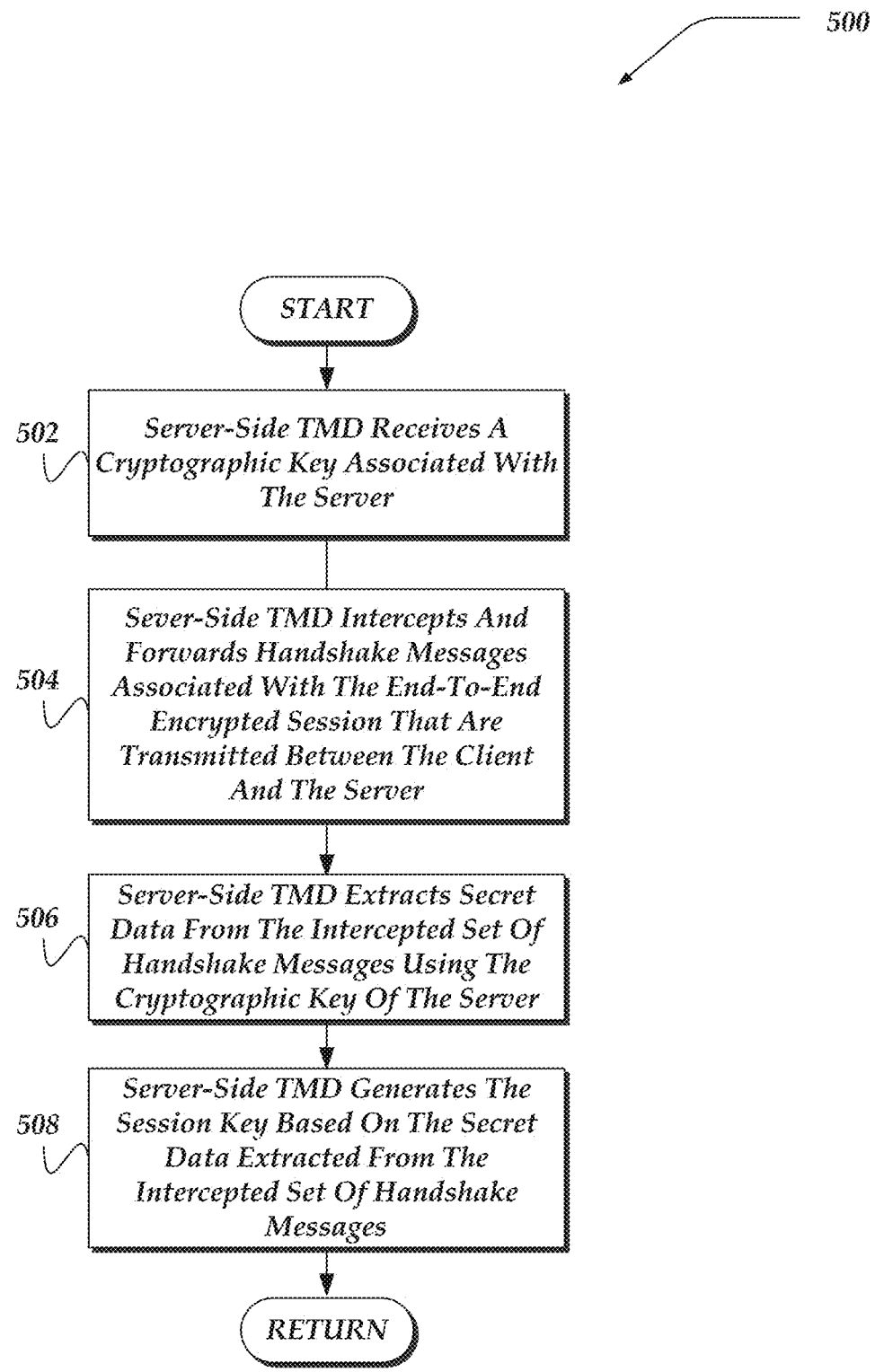
FIG. 5 illustrates a logical flow diagram generally showing one embodiment of a process for generating a session key associated with an end-to-end encrypted session.

FIG. 5 illustrates a logical flow diagram generally showing one embodiment of a process for generating a session key associated with an end-to-end encrypted session. In one embodiment, process 500 may be implemented by server-side TMD 110.

Process 500 begins, after a start block, at block 502, by receiving a private key associated with the first server device. In one embodiment, the first server device may comprise one of server devices 112-115 illustrated in FIG. 1. In one embodiment, the private key of the first server device may be provided by a system administrator. Additionally or alternatively, the private key may be provided by a local domain controller, LDAP server, or the second network device itself.

At block 504, a first set of handshake messages associated with an encrypted session are intercepted. In one embodiment, the creation of the encrypted session may be initiated by a client device, such as one of client devices 102-104. In one embodiment, the first set of handshake messages includes a "CLIENT HELLO" message sent by the client device toward a first server device. After being intercepted and stored, the "CLIENT HELLO" message may be forwarded on to the first server. In one embodiment, by storing the intercepted handshake messages such as the "CLIENT HELLO" message, the server-side TMD is enabled to perform the actions described herein at any time throughout the lifetime of the corresponding encrypted session.

In response to the "CLIENT HELLO", the first server device may send a "SERVER HELLO" message, a "SERVER CERTIFICATE" message enabling the client device to identify the first server device, a "SERVER KEY EXCHANGE" message including the first server device's public key, a "CERTIFICATE REQUEST" message requesting that the client send its certificate enabling the server device to identify the client device, and a "SERVER HELLO DONE" message, all of which may be intercepted and stored in a first set of handshake messages, and forwarded on to the client device.

In response to the "SERVER HELLO DONE" message, the client device may in one embodiment transmit a "CLIENT KEY EXCHANGE" message, including a random number (e.g. a nonce) generated by the client device and encrypted with the first server device's public key. In one embodiment, the "CLIENT KEY EXCHANGE" message may be intercepted, stored in the first set of handshake messages, and forwarded on to the first server device. Additionally or alternatively, the first set of handshake messages may include any additional messages exchanged between the client device and the first server device while establishing the encrypted session, for example a "CERTIFICATE" message containing the client device's certificate enabling the server device to identify the client device. In one embodiment, upon completion of this exchange of handshake messages, the client device and the first server device have established an end-to-end encrypted session.

Processing next continues to block 506, where secret data is extracted from the intercepted first set of handshake messages. In one embodiment, the received private key of the first server device may be used to extract secret data by decrypt the payload of the "CLIENT KEY EXCHANGE", including a random number generated by the client device and encrypted with the public key of the first server device. Additionally or alternatively, the server-side TMD extracts the "pre-master secret."

Processing next continues to block 508 where, in one embodiment, the decrypted random number is used in combination with one or more other random numbers exchanged between the client device and the first server device to generate a session key. In one embodiment, the session key may be a "master secret". In one embodiment, the session key is combined with one or more other random numbers exchanged during the encrypted session handshake to generate connection keys. The connection keys may be used to encrypt and decrypt data transmitted over the encrypted connection.

In one embodiment, the client device and the first server device also independently calculate the session key based on the exchanged handshake messages. In one embodiment, the client device and the first server device also independently calculate the connection keys. In some embodiments, the server-side TMD may calculate the session key based on information in the intercepted handshake messages. Alternatively, instead of independently calculating the session key, the server-side TMD may receive the session key and/or connection key(s) from one of the first server, the client, another network device, or a system administrator.

Regardless of how the connection keys are generated or obtained, the connection keys enable encrypted data transmitted between the client device and the first server device to be decrypted. In one embodiment, the server-side TMD may decrypt the data using the connection keys, and then may augment, delete, enhance, or otherwise modify the decrypted data. In one embodiment, the server-side TMD may re-encrypt the modified data using the connection keys, and transmit the modified data to the other of the client device and the first server device. The process then terminates at a return block.

Figure 6:
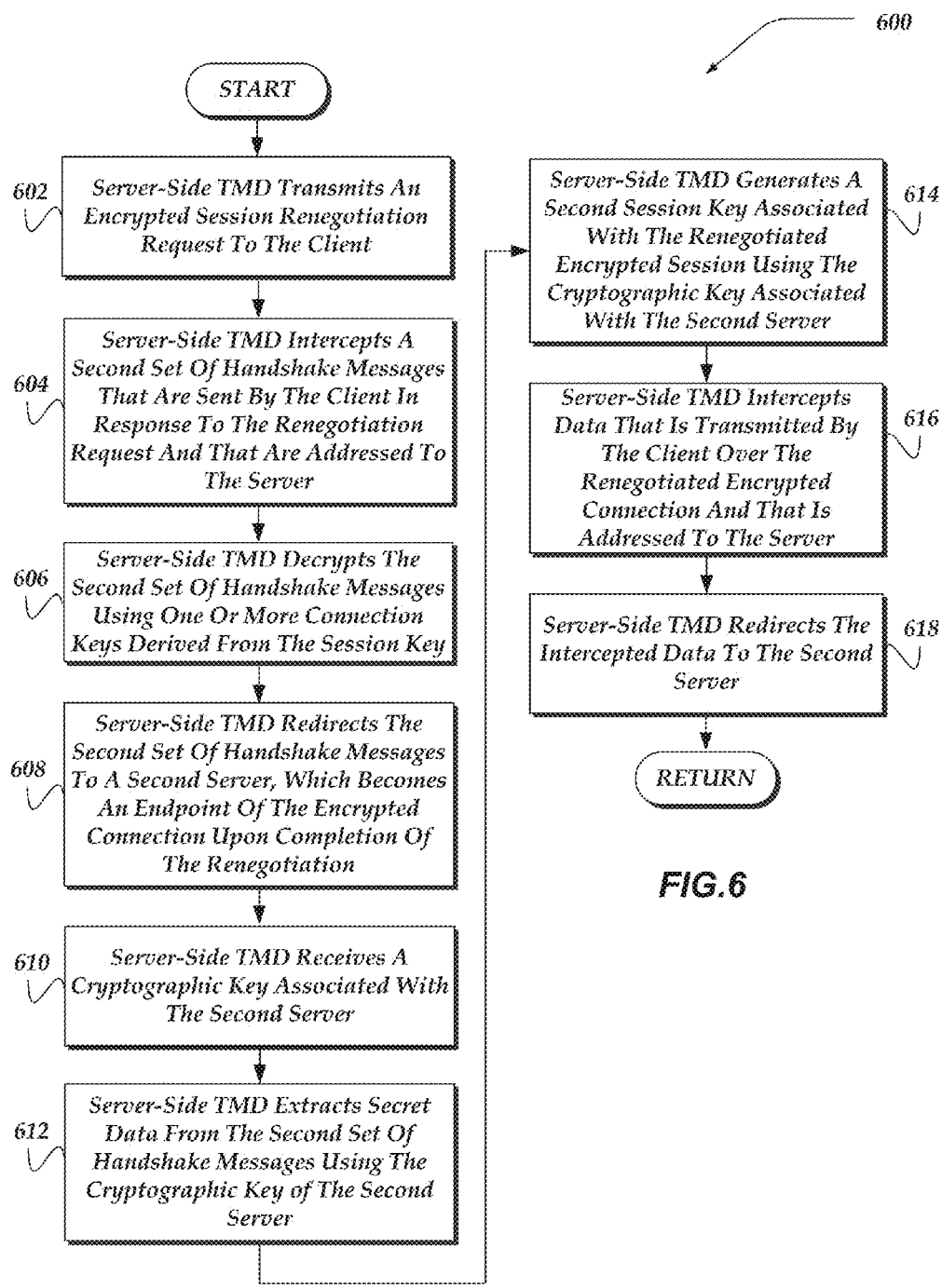
FIG. 6 illustrates a logical flow diagram generally showing one embodiment of a process for replacing an endpoint in an end-to-end encrypted connection with a second server device.

FIG. 6 illustrates a logical flow diagram generally showing one embodiment of a process for replacing an endpoint in an end-to-end encrypted connection with a second server device. In one embodiment, process 600 may be implemented by server-side TMD 110.

Process 600 begins, after a start block, at block 602, where in one embodiment server-side TMD transmits a renegotiation request to the client device over the end-to-end encrypted connection. In one embodiment, the server-side TMD transmits the renegotiation request message in response to extracting an HTTP header sent by either the client device or the first server device, and determining the HTTP header includes a request for content located on the second server device. Server-side TMD 110 may direct a request for a resource to a particular server device based on network traffic, network topology, capacity of a server device, content requested, and a host of other traffic distribution mechanisms. Also, sever-side TMD 110 may recognize packets that are part of the same communication, flow, and/or stream and may perform special processing on such packets, such as directing them to the same server device.

In one embodiment, the server-side TMD requests or otherwise initiates renegotiation by originating and transmitting an "SSL HELLO REQUEST" to the client device over the end-to-end encrypted connection. In one embodiment, the server-side TMD utilizes encrypted connection renegotiation to replace the first server device with one or more second server devices as an endpoint of the end-to-end encrypted connection. As discussed above, the client (or server) device may in one embodiment not know that a different server (or client) device has become the endpoint. In this way, the function of the server-side TMD may be transparent to the client (or server) device.

Processing next continues to block 604, where the server-side TMD intercepts a second set of handshake messages sent in response to the "SSL HELLO REQUEST". In one embodiment, the second set of handshake messages are encrypted using connection key and transmitted by the client device over the end-to-end encrypted connection. In one embodiment the second set of handshake messages are addressed to the first server device.

Processing next continues to block 606, where the server-side TMD decrypts the second set of handshake message using the connection key.

Processing next continues to block 608, where the server-side TMD redirects the decrypted second set of handshake messages to the second server device, thereby enabling the second server device to become an endpoint in the end-to-end encrypted connection. In one embodiment, by directing the second set of handshake messages to the second server device, the requests made by the client device over the end-to-end encrypted connection may be re-distributed by the server-side TMD to more than one server device. In one embodiment, the existing connection that had been established between the server-side TMD and the first server device is gracefully terminated by the server-side TMD. Alternatively, the existing connection between the server-side TMD and the first server device may be cached, pooled, or otherwise maintained for future use.

Additionally or alternatively, instead of establishing the second server device as an endpoint, the server-side TMD may utilize encrypted connection renegotiation to make itself an endpoint of the encrypted connection. In this embodiment, the server-side TMD may act as an encrypted connection accelerator: receiving encrypted content from the client device, decrypting the received content, forwarding the decrypted content to a server device for processing, and encrypting the server device's response. In such instances, the TMD may communicate with the first server device in the clear or establish another connection with the first server device. In another embodiment, the server-side TMD may generate encrypted content itself, rather than forwarding content from another server, such as a cached data or generated data. In another embodiment, a client-side TMD may similarly utilize encrypted connection renegotiation to make itself an endpoint of the encrypted connection, act as an encrypted connection accelerator, generate content such as cached data, and the like. Additionally or alternatively, the server-side TMD may ignore the ensuing renegotiation between the client device and the first server device, such that the server-side TMD ceases to decrypt and modify content sent over the end-to-end encrypted connection. Instead, the server-side TMD may route data sent over the renegotiated encrypted connection to the first server device as it would any other network connection. In some embodiments, a client-side TMD may also utilize encrypted connection renegotiation to ignore an ensuing renegotiation, "stepping out" of the encrypted connection.

Additionally or alternatively, the server-side TMD may terminate an encrypted connection to a client device and another encrypted connection to a server device. The server-side TMD may convert this pair of encrypted connections into a single end-to-end encrypted connection between the client device and the server device. In one embodiment, the server-side TMD may perform such a conversion by utilizing encrypted connection renegotiation and handshake message forwarding between the client device and the server device. In such an embodiment, the TMD may then perform any of the operations described herein on data transmitted over the end-to-end encrypted connection.

Processing next continues to block 610, where the private key of the second server device is received by the server-side TMD. Additionally or alternatively, the server-side TMD may receive the private key of the second server device before transmitting the renegotiation request. In one embodiment, the server-side TMD receives the private key of the second server device in any of the manners discussed above with regard to receiving the private key of the first server device.

Processing next continues to block 612, where the private key of the second server device is used to extract secret data from the second set of handshake messages. In one embodiment, the server-side TMD extracts secret data from the second set of handshake messages in a manner similar to the extraction of secret data from the first set of handshake messages, as discussed above with respect to block 506.

Processing next continues to block 614, where the server-side TMD generates a second session key based at least on the secret data extracted from the second set of handshake messages. In one embodiment, the second session key is generated in a manner similar to the generation of the first session key, as discussed above with respect to block 508. In one embodiment, the generated second session key is utilized to create a second set of connection keys, defining an end-to-end encrypted connection between the client device and the second server device.

Processing next continues to block 616, where a message sent over the end-to-end encrypted connection of the re-negotiated end-to-end encrypted session is intercepted and processed by the server-side TMD. In one embodiment, the intercepted message is transmitted by the client device and is addressed to the first server device, as the client device may be unaware that the second network device is now the other endpoint of the renegotiated end-to-end encrypted session. Additionally or alternatively, the second server device may transmit a message that is intercepted and processed by server-side TMD. In either case, server-side TMD may perform additional processing, optionally in conjunction with a client-side TMD and/or third party content provider 118, to augment, delete, prune, enhance, delay, accelerate, or otherwise modify the intercepted message. For example, an advertisement or other content may be provided by third party content provider 118, which may then be embedded in data transmitted between the second server device and the client device.

Processing next continues to block 618, where in the embodiment in which the sever-side TMD intercepts a message transmitted by the client device and addressed to the first server device, the server-side TMD redirects the intercepted message to the second server device. The process then terminates at a return block In one embodiment, the process illustrated in FIG. 6 enables an existing end-to-end encrypted connection to be handed off to a new server device, while from the perspective of the client device, the identity of the server is unchanged. In one embodiment, renegotiation happens within the existing encrypted session tunnel.

Figure 7:
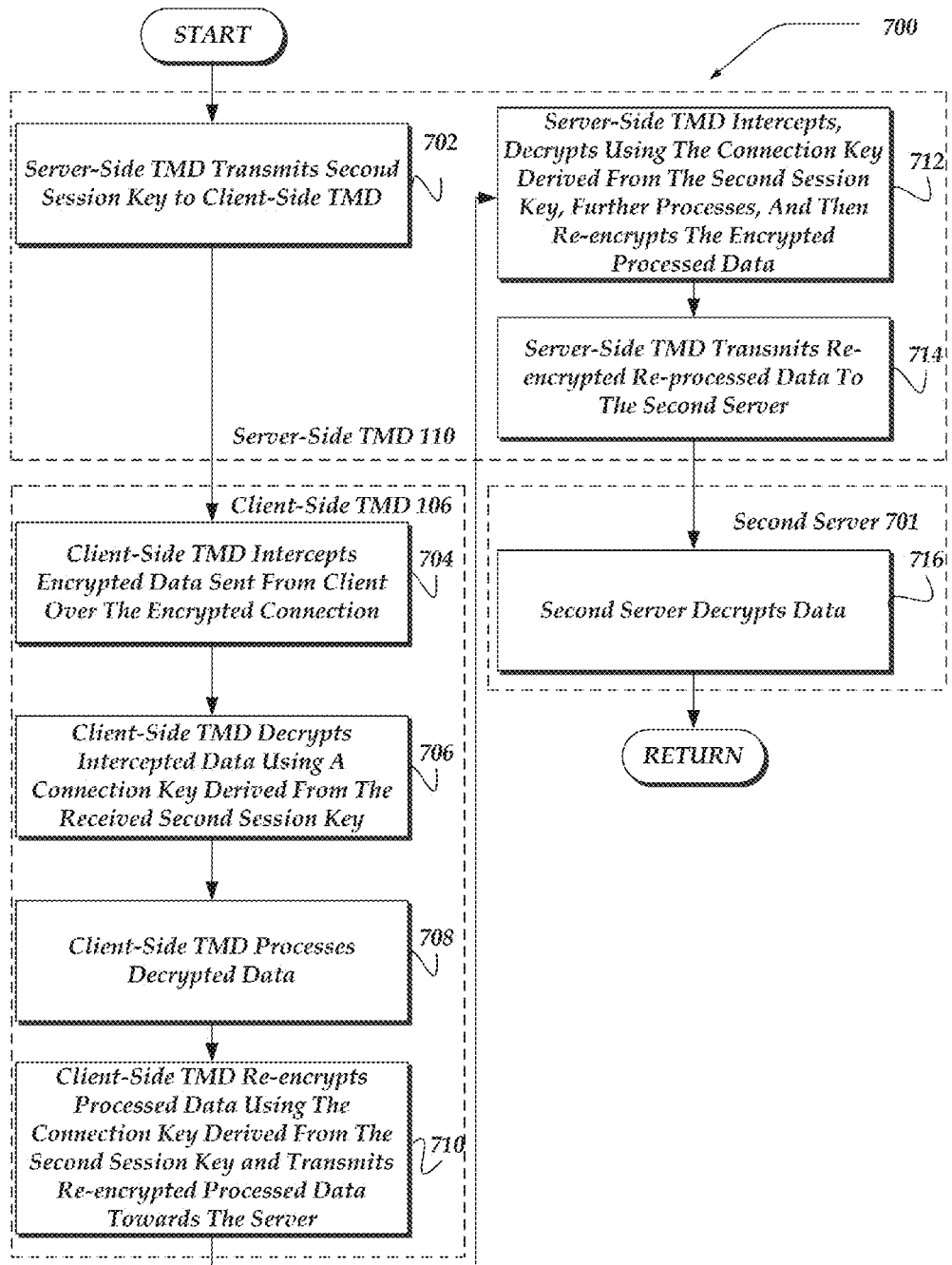
FIG. 7 illustrates a logical flow diagram generally showing one embodiment of a process for enhancing data transmitted between a client-side traffic management device (TMD) and a server-side TMD over the encrypted connection.
Figure 8:
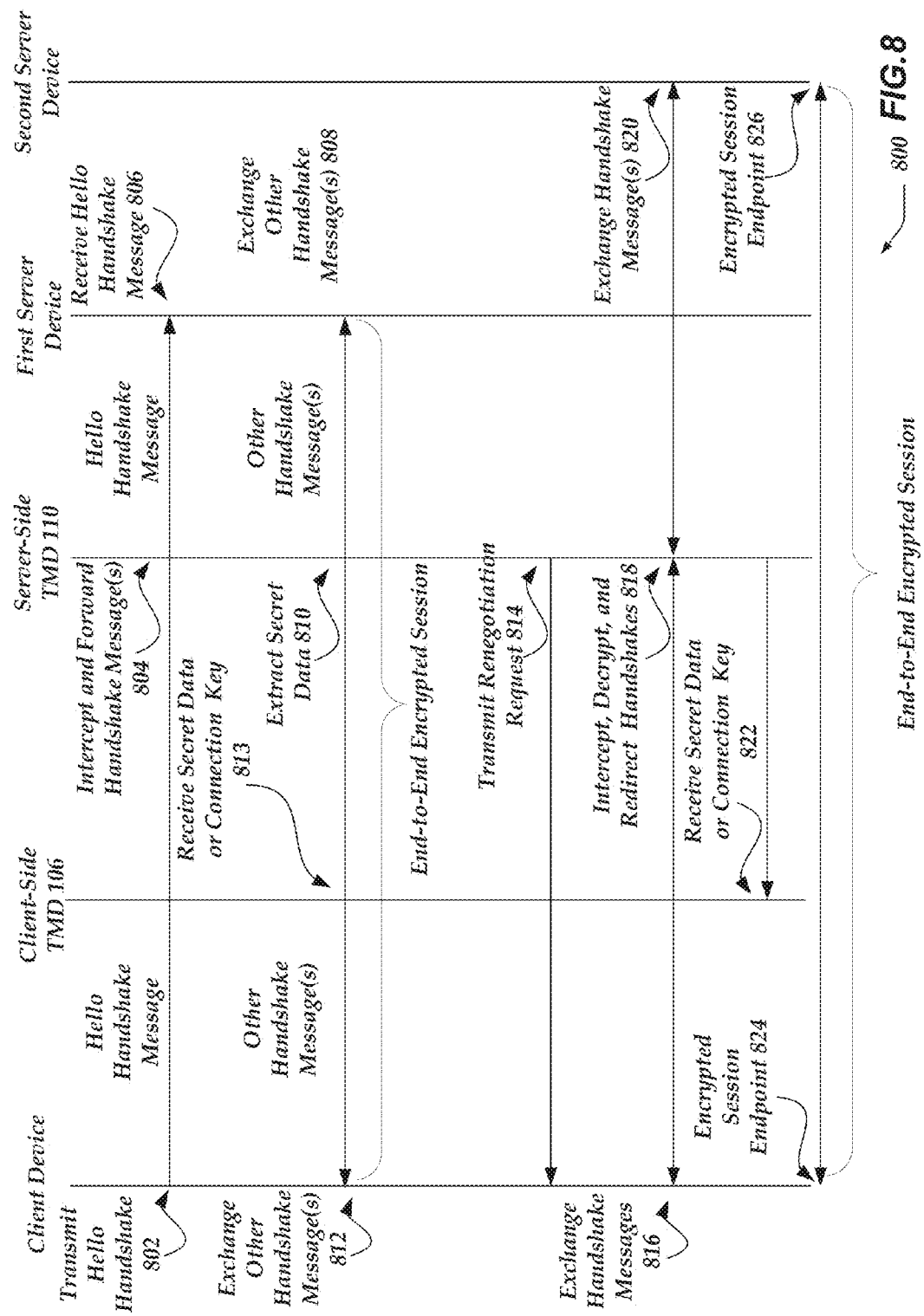
FIG. 8 illustrates one embodiment of a signal flow diagram generally usable with the process of FIG. 4.

FIG. 7 illustrates a logical flow diagram generally showing one embodiment of a process for enhancing data transmitted between a client-side TMD and a server-side TMD over the encrypted connection. In one embodiment, process 700 may be implemented by server-side TMD 110.

Process 700 begins, after a start block, at block 702, where the server-side TMD 110 transmits the second set of connection keys to a client-side TMD 106. In one embodiment, the second set of connection keys may be transmitted over the end-to-end encrypted session. Alternatively, the second set of connection keys may be transmitted over a separate encrypted session/connection, such as secure tunnel (B).

Processing next continues to block 704, where the client-side TMD 106, in one embodiment, intercepts encrypted data sent from the client device over the end-to-end encrypted connection. In one embodiment, typically when the client device is unaware that the second server device is now the endpoint of the end-to-end encrypted connection, the encrypted data sent by the client device may be addressed to the first server device. Additionally or alternatively, when the client device is aware that the second server device 701 is now the endpoint of the end-to-end encrypted connection, the encrypted data sent by the client device may be addressed to the second server device 701.

Processing next continues to block 706, where the client-side TMD 106, in one embodiment, decrypts the intercepted data using the received second set of connection keys.

Processing next continues to block 708, where the client-side TMD 106, in one embodiment, processes the decrypted data. In one embodiment, the decrypted data may be augmented, deleted, compressed, accelerated, or otherwise modified.

Processing next continues to block 710, where the client-side TMD 106, in one embodiment, re-encrypts the processed data using the second set of connection keys, and transmits the re-encrypted processed data towards the second server device 701. In this embodiment, processing continues at block 712.

Additionally or alternatively, the client-side TMD 106 may explicitly be working in conjunction with server-side TMD 110 to transmit data between the client device and the second server device 701. In this case, the client-side TMD 106 may transmit the processed data to the server-side TMD 110 using a separate tunnel, such as secure tunnel (B) through network 108. In this embodiment, the secure tunnel (B) may utilize an encrypted connection separate and apart from the end-to-end encrypted connection. In other words, client-side TMD 106 may communicate with server-side TMD 110 using a separate set of connection keys to encrypt the processed data, or another type of encryption entirely. Upon receiving the data transmitted through secure tunnel (B), the server-side TMD 110 typically decrypts and performs further processing on the decrypted data. For example, if the client-side TMD 106 compressed the processed data to reduce transmission time, the server-side TMD 110 typically may decompress the data, and optionally perform additional processing as discussed throughout this disclosure. Then, processing continues at block 714.

In one embodiment, the client-side TMD 106 and the server-side TMD 110 may utilize two levels of encryption—the encryption used for the end-to-end encrypted connection established between the client device and the second server device 701, and additionally the encryption used by secure tunnel (B). This embodiment provides two layers of security for data transmitted over public networks, such as the internet, enhancing security of the transmitted data.

Processing next continues to block 712, where the server-side TMD 110 intercepts the processed data sent by the client-side TMD 106. In one embodiment, the server-side TMD 110 decrypts the intercepted data using the second set of connection keys.

In one embodiment, server-side TMD 110 performs further processing on the intercepted and decrypted data. In one embodiment, server-side TMD 110 augments, deletes, decompresses, or otherwise modifies the intercepted and decrypted data.

Processing next continues to block 714, where the server-side TMD 110 encrypts the further processed data using the second set of connection keys, and transmits the re-encrypted data to the second server device 701. In one embodiment, regardless of whether data was intercepted, decrypted, modified, re-encrypted, forwarded, or the like, the end-to-end encrypted connection (e.g. a connection contained in secure session (A) as shown in FIG. 1) remains intact from the perspective of the client device and the second server device 701.

Processing next continues to block 716, where the second server device 701 receives, decrypts, and processes the data transmitted by the server-side TMD 110. The process then terminates at a return block FIG. 8 illustrates a signal flow diagram generally showing one embodiment of the process of FIGS. 4-6.

Process 800 begins at 802 by the client device transmitting a "CLIENT HELLO" handshake message as discussed above with respect to block 504. Processing continues to 804, where the server-side TMD 110 intercepts and forwards handshake messages as also discussed above with respect to block 504. Processing continues to 806, where the first server receives the "CLIENT HELLO" handshake message, among others, as discussed above with respect to block 504.

Processing continues to 808 and 812, where other handshake messages are exchanged between the client device and the first server device, as discussed above with respect to block 504.

Processing continues to 810, where secret data, such as a random number generated by the client device and encrypted by the client device with the public key of the first server device, is extracted from the other handshake messages by the server-side TMD 110 using the private key of the first server device, as discussed above with respect to block 508.

Processing optionally continues to 813, where secret data, such as the secret data generated in 810, is received by client-side TMD 106. In one embodiment, this secret data may be used to generate a connection key. Additionally or alternatively, a connection key may be received by client-side TMD 106. In one embodiment, either the secret data or the connection key may be transmitted to client-side TMD 106 by server-side TMD 110. Once client-side TMD 106 has received or generated the connection key, client-side TMD 106 is enabled to intercept and enhance encrypted data as it is transmitted over the connection.

Processing continues to 814, where a renegotiation request is transmitted by the server-side TMD 110 to the client device, as discussed above with respect to block 602.

Processing continues to 816 and 820, where in response to receiving the renegotiation request, the client device begins to exchange a second set of handshake messages, as discussed above with respect to block 412.

Processing continues to 618, where the server-side TMD 110 intercepts, decrypts, and redirects the second set of handshake messages towards the second server, as discussed above with respect to blocks 604 and 606.

Processing continues to 822, where the server-side TMD 110 transmits the second set of connection keys to the client-side TMD 106, as discussed above with regard to FIG. 7.

Processing continues to 824 and 826, where the end-to-end connection initially established between the client device and the first server device has been altered as a result of the requested renegotiation, resulting in the encrypted connection being re-established between the client device and the second server device.

Figure 9:
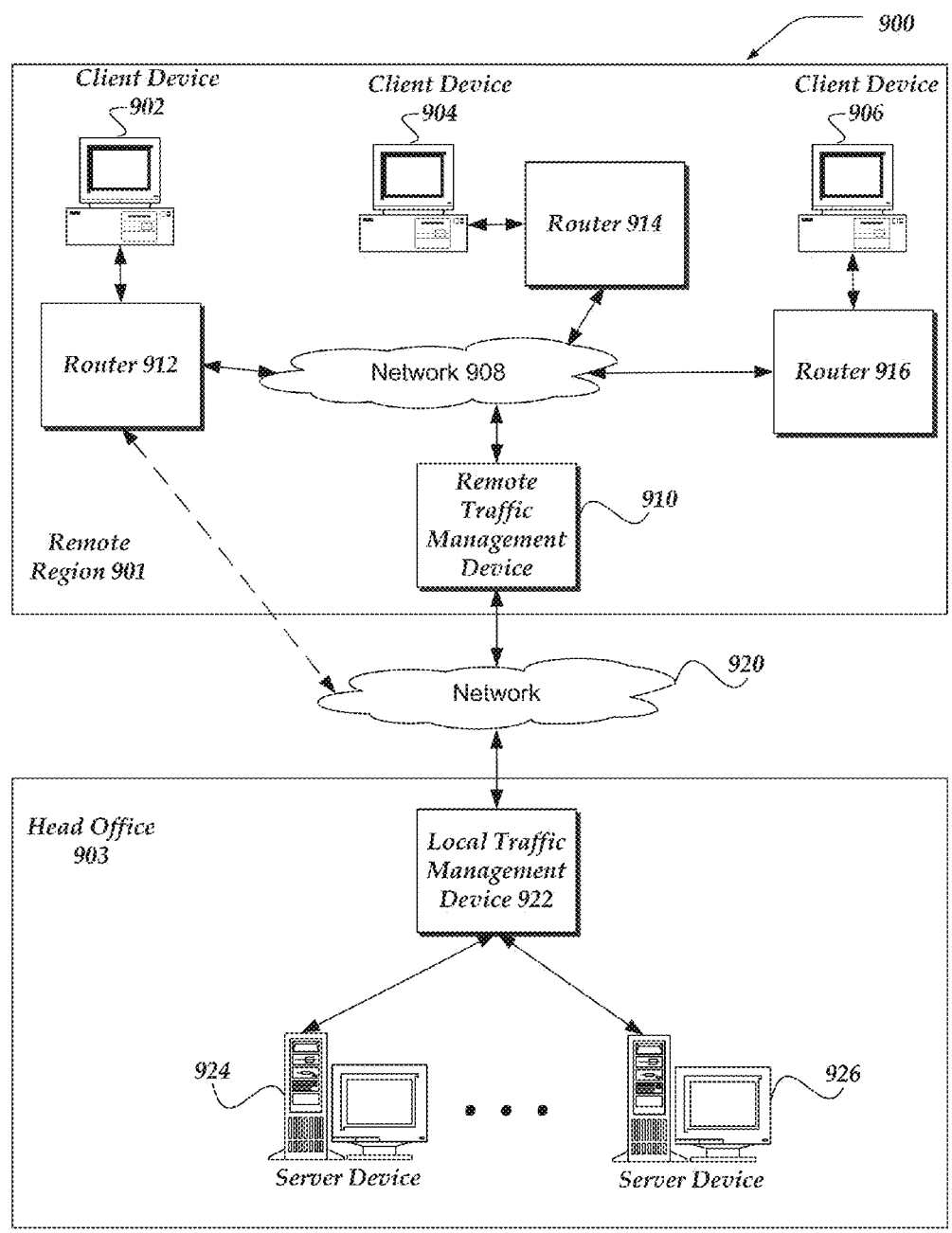
FIG. 9 illustrates a functional block diagram illustrating an environment for utilizing a Border Gateway Protocol (BGP) to route traffic to a client-side traffic management device for encrypted sessions.

Illustrative Operating Environment for Routing Based on Border Gateway Protocol (BGP) Broadcasting FIG. 9 shows components of an illustrative environment 900 in which the Border Gateway Protocol (BGP) may be utilized to direct traffic from client devices 902, 904, and 906 through client-side traffic management device 910. In one embodiment, client devices 902, 904, and 906 are geographically located in a remote region 901, where the client devices 902, 904, and 906 typically are not connected to the Internet through a client-side TMD. As a result, client devices 902, 904, and 906 may typically transmit data through routers 912, 914, and 916 respectively, communicating directly with the head office 903 through network 920. This connection is illustrated as a dotted line between router 912 and network 920.

However, it is often desirable to direct traffic from one or all of client devices 902, 904, and 906 through a single client-side traffic management device, such as client-side TMD 910. For instance, it may not be cost efficient to provision a client-side TMD for every branch office in the remote region 901, but it would be cost efficient to provision a single client-side TMD for some or all branch offices in the remote region 901. In some embodiments, client-side TMD 910 may be considered a remote TMD as depicted in FIG. 9, as it may be remote from head office 903.

In one embodiment, client-side TMD 910 may be configured to broadcast a message using the BGP protocol. In one embodiment, the client-side TMD 910 may broadcast a BGP protocol message indicating that it knows the best route to the head office 903. As such, after this BGP message propagates to routers 912, 914, and 916, these routers may route requests by client devices 902, 904, and 906 through network 908 to client-side TMD 910. Once received by the client-side TMD 910, communication between the client devices and the server devices may be optimized as discussed above with respect to FIG. 7.

Example Authentication Operations

In system configurations where client validation is requested as well as server validation, such as in a two-way SSL session, client certificate authentication may consume significant computing resources. Given that, a heavy load may be placed on a server (e.g. a content server) if it handles both client certificate authentication and client requests for content. In such situations, it may be advantageous to off-load the work of validating the client device to an authentication server, such as authentication server 115 shown in FIG. 1.

An end-to-end encrypted session may be established between a client (such as one of client devices 102-104 in FIG. 1) and an authentication server (such as authentication server device 115 in FIG. 1). In some embodiments, the end-to-end encrypted session may be a two-way SSL session, established through the authentication server's authentication of the client's certificate and the client's authentication of the authentication server's certificate, as described herein. In some embodiments, the end-to-end encrypted session may utilize a connection between the client and authentication server, referred to herein as a first connection or encrypted first connection.

In some embodiments, the end-to-end encrypted session between a client and an authentication server may be established in response to the client's request for one or more particular resources served by a particular server (e.g. an HTTP request for an item of content on a web server). In some embodiments, the end-to-end encrypted session between client and authentication server may be established in response to the client's request for general access to a pool of resources served by a group of servers (e.g. an indeterminate number of servers that may be connected within a sub-network). In any case, the client's request may initiate a negotiation between the client and the authentication server to establish the end-to-end encrypted session. In embodiments where the session is an SSL session, such negotiation may include a series of SSL handshakes to exchange secret data between client and server, as described herein.

Figure 10:
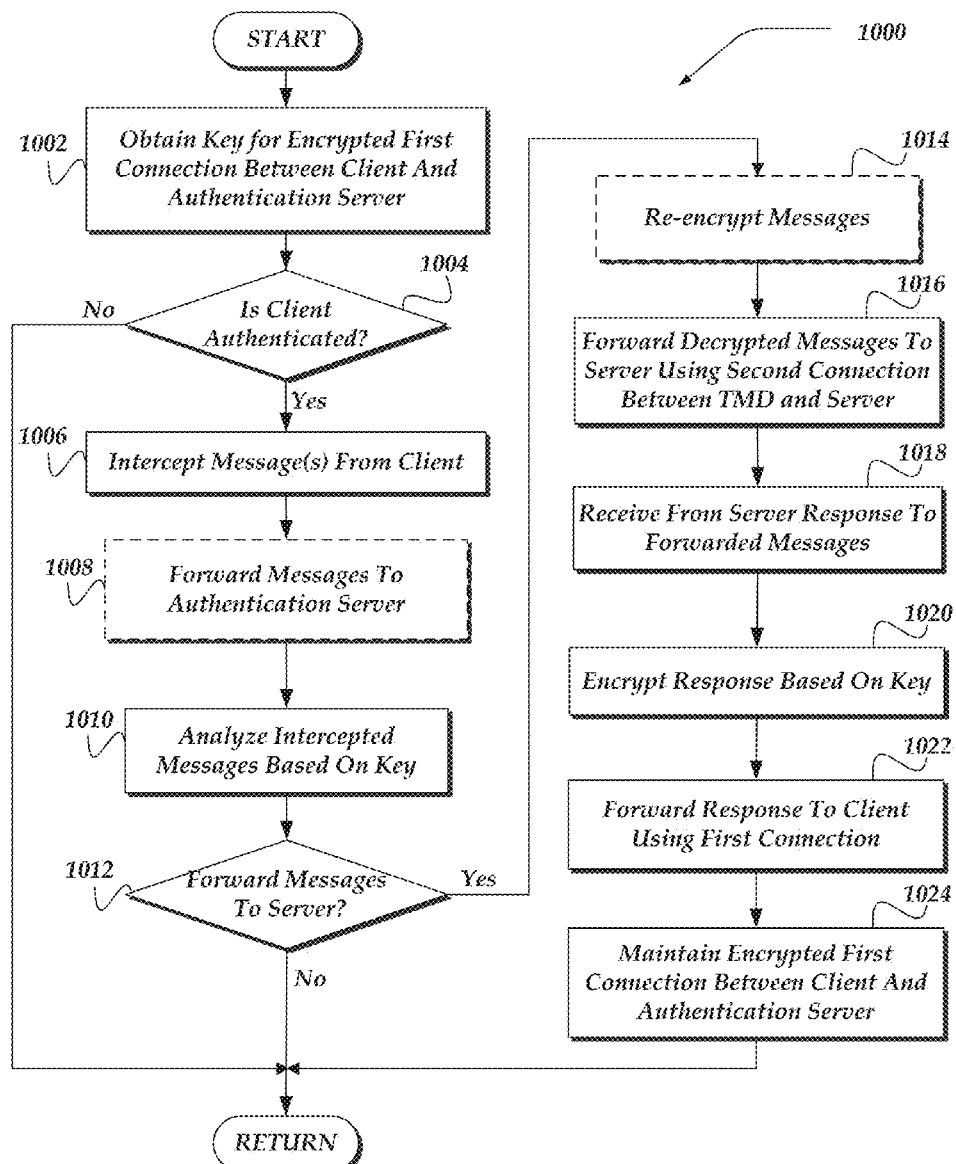
FIG. 10 illustrates a logical flow diagram showing one embodiment of a process for managing client validation.

The TMD (such as TMD 106 or 110 of FIG. 1) may be configured to monitor the establishment of the end-to-end encrypted session established between client and authentication server, through decryption and analysis of the messages exchanged between client and authentication server. Subsequent to the establishment of the encrypted session, the TMD may intercept, decrypt and/or forward network traffic sent from the client to request certain resources (e.g. task traffic). FIG. 10 illustrates an embodiment of such a process 1000 that may be performed by the TMD. In some embodiments, process 1000 may be implemented as an application, program, software module or the like that executes within mass memory of the TMD, for example encrypted session manager 252 of FIG. 2.

Process 1000 begins at block 1002, when a key associated with an encrypted first connection between a client and an authentication server is obtained. In some embodiments, the encrypted first connection may be used to establish an encrypted session between client and server, such as an SSL session. In some embodiments, the key may be a session key or master key associated with an SSL session, as described above. Obtaining the key may proceed as described above with regard to block 402 of FIG. 4 and/or block 502 of FIG. 5. In some embodiments, the encrypted first connection may facilitate a two-way authentication between the client and authentication server. For example, the encrypted first session may be employed by the client and authentication server to establish a two-way SSL.

At a decision block 1004, a determination is made whether the client has been validated by the authentication server, such that an end-to-end encrypted session has been established between client and authentication server. In some embodiments, this determination may result from monitoring of messages exchanged between client and authentication server in the course of establishing the end-to-end encrypted session, such as the SSL handshake messages discussed herein. In such cases, the determination that the client has been validated may be based on detecting a particular handshake message in a series of SSL handshake messages. For example, detection of a CLIENT-KEY-EXCHANGE handshake message that includes a pre-master secret may indicate successful validation of the client by the authentication server. In some embodiments, a message or other indication may be received from the authentication server indicating that the client device has been validated and is therefore trusted to be given access to certain resources. Such indication may be a token that identifies the client as an authenticated (e.g. trusted) client as determined in the course of the two-way authentication between client and authentication server. If it is determined at decision block 1004 that the client is not validated, process 1000 may return.

In some embodiments, following the authentication server's validation of the client, the authentication server may send one or more messages indicating that the client is still validated. Such messages may be sent periodically by the authentication server at a predetermined time interval, and/or in response to a status request from the network device responsible for forwarding client traffic to a server, such as a TMD. In some embodiments, the messages may function to refresh and/or update a token provided by the authentication server to indicate that the client is validated. In some embodiments, the continued activity of the end-to-end encrypted session between client and authentication server indicates that the client remains validated and/or trusted.

If it is determined at decision block 1004 that the client is validated, process 1000 proceeds to block 1006 where messages are intercepted that are sent from the client toward the authentication server over the encrypted first connection. In some embodiments, the messages from the client may be received subsequent to the determination that the client is validated. In some embodiments, the messages may include a client request for access to a particular resource. For example, the messages may include an HTTP or other type of request for web content that is hosted by a particular server, such as one of server devices 112-114 shown in FIG. 1. In some embodiments, the messages may include a client request for general access to one or more servers, and/or to a network or sub-network of one or more servers.

Optionally, at block 1008, the intercepted messages are forwarded to the authentication server over the encrypted first connection. In some embodiments, the encrypted first connection between client and authentication server may be maintained while subsequent traffic from the client (e.g. task traffic) is sent to the authentication server as well as forwarded to a server over a second connection. This maintenance of the first connection may enable the authentication server to log information included in the one or more messages, or to perform other operations related to AAA. For example, the authentication server may be configured to log information related to the identity of the user of the client (e.g. username, login, personal name, and the like), and/or information regarding the client device itself (e.g. IP and/or MAC address information, device ID number, class of device, capabilities of device, supported content formats, and the like). In some embodiments, the authentication server may log information regarding the application executing on the client device to request the content, information related to the particular requests made by the client (e.g. time of request, particular content requested, the particular server(s) that the content is requested from, and the like), and/or information related to the connection itself (e.g. time active, quantity of traffic, connection speed). Other examples of types of logged information may be contemplated without departing from the scope or spirit of the invention. Further, in some embodiments forwarding of the messages toward the authentication server may enable the authentication server to keep the first connection between the client and authentication server active.

At block 1010, the intercepted messages are analyzed based on the key. In some embodiments, this analysis may include a decryption of the intercepted messages based on the key. In some embodiments, decryption may include calculating or otherwise determining one or more connection keys based on the key, and employing the one or more connection keys to decrypt the messages intercepted from the client. In some embodiments, connection keys may include cipher keys used to encrypt and decrypt communicated data over the SSL session associated with the session key, as discussed herein. For example, determination of connection keys may proceed as described herein with regard to block 508 of FIG. 5. In some embodiments, analysis of the intercepted messages may include an analysis of header and/or payload data in the packets that form the messages, to determine whether the messages are of a particular type and/or include particular data.

At decision block 1012, a determination is made whether one or more of the decrypted, intercepted messages are to be forwarded to a server. In some embodiments, such a determination may be based on an analysis of information included in the messages and accessible after decryption of the messages. For example, a determination may be made that the messages include a client request for a particular resource(s) and/or access to one or more servers, and that the messages may be forwarded toward a server or a cluster of servers that can fulfill the client's request. As a further example, a determination may be made that the messages include handshake messages for a renegotiation of the encrypted session between client and authentication server, and may not be forwarded to a server. If it is determined that the messages should not be forwarded to a server, process 1000 may return, or continue monitoring traffic on the first connection for messages that may be forwarded.

If it is determined that messages are to be forwarded to a server, a second connection may be determined to use for forwarding the messages. In some embodiments, the second connection may be a new connection that is created from the TMD to a particular server device, or to a network device that is in communication with one or more server devices (e.g. a router, proxy, network gateway or the like). In some embodiments, the second connection may be selected from a pool of existing connections that have already been established to one or more servers. In some embodiments, the second connection may be determined based on a load balancing algorithm to balance request load among a plurality of servers in a server farm, server cluster, or the like. Moreover, in some embodiments the server may not have any information about the authentication server, and may rely on the TMD to forward traffic from those clients that have been properly validated by the authentication server.

In some embodiments, the second connection may be an encrypted connection. For example, the second connection may be encrypted in that it is associated with an encrypted session (e.g. SSL session) between the TMD and a server. In some embodiments, the second connection may be encrypted using a different encryption strength than the encrypted first connection between client and authentication server. For example, the second connection may carry a one-way SSL session established through the server's authentication of the TMD's certificate, or through the server's authentication of the client's certificate. In some embodiments, the second connection may be encrypted using a different cryptographic protocol than the encrypted first connection. For example, the first connection may be encrypted using SSL and the second connection may be encrypted or otherwise secured using one of IPSec, Kerberos, and the like. Further, in some embodiments, the second connection may be unencrypted, such that traffic is sent over the second connection in plaintext.

Because the second connection may be unencrypted or encrypted using a different encryption strength than the first connection, the more resource-intensive responsibility for client validation may be off-loaded to a dedicated authentication server, while request traffic from the client to server may proceed over a less strongly encrypted (or unencrypted) and therefore less resource-intensive second connection to the server.

At block 1014, the messages are optionally re-encrypted prior to forwarding them on to a server. For example, such re-encryption may be performed in embodiments where the second connection is an encrypted connection between TMD and server. In some embodiments, encryption may be by way of SSL as discussed herein, or other encryption/security protocol.

At block 1016, the intercepted messages are forwarded to a server using the second connection. In some embodiments, such forwarding may be a selective forwarding of certain messages, based on an analysis of the messages as described herein. In some embodiments, the server may be a particular back-end server that is hosting a particular resource that the client has requested, such as web content requested through an HTTP request by the client. In some embodiments, traffic may be forwarded toward a networked plurality of servers (e.g. server cloud, server farm, server cluster, or the like) that the client is requesting access to, prior to the client requesting any particular resource. In this way, a network device executing process 1000 may be configured to act as a proxy to enable the client to have general access to a network or sub-network of servers. Moreover, it should be noted that in some embodiments the forwarding of traffic as described herein may be performed such that it is transparent to the client device, i.e. the client device is not aware that such forwarding is occurring. In some embodiments, where the authentication server has provided a token indicating that the client is validated, such token may be inserted into messages forwarded to the server. For example, the token may be incorporated into the headers of one or more packets forwarded to the server.

At block 1018, one or more response messages may be received. Such response messages may be sent by the server in response to at least one of the messages forwarded to the server. In some embodiments, response messages may be responses to the client's requests. For example, the responses from the server may include items of content requested by the client in HTTP requests included in the intercepted messages.

At block 1020, the response messages are encrypted based on the key. In some embodiments, encryption may employ one or more connection keys that are calculated using the key, for example when the key is a session key or master key associated with the two-way SSL session between client and authentication server. At block 1022, the encrypted responses are forwarded to the client, using the encrypted first connection between client and authentication server. In some embodiments, use of the encrypted first connection to forward the responses to the client may enable a degree of transparency of the process from the perspective of the client, such that the client is unaware that the interception and forwarding of its traffic has occurred.

At block 1024, the encrypted first connection between the client and the authentication server is maintained. In some embodiments, the encrypted first connection is actively maintained by way of communication(s) between the authentication server, TMD, and/or the client. This may include the authentication server periodically sending a keep-alive message or some other indication that the client is still trusted. In some embodiments, the TMD, client device, or other network device may be configured to send a keep-alive message to the authentication server to instruct the authentication server to maintain the first connection with the client. In some embodiments, the messages intercepted from the client may be forwarded to the authentication server as well as to a server. In such cases, the forwarded traffic itself may indicate that the authentication server should maintain the first connection with the client. In some embodiments, the maintenance of the first connection between client and authentication takes place throughout the operation of process 1000. Following block 1024, process 1000 may return.

Figure 11:
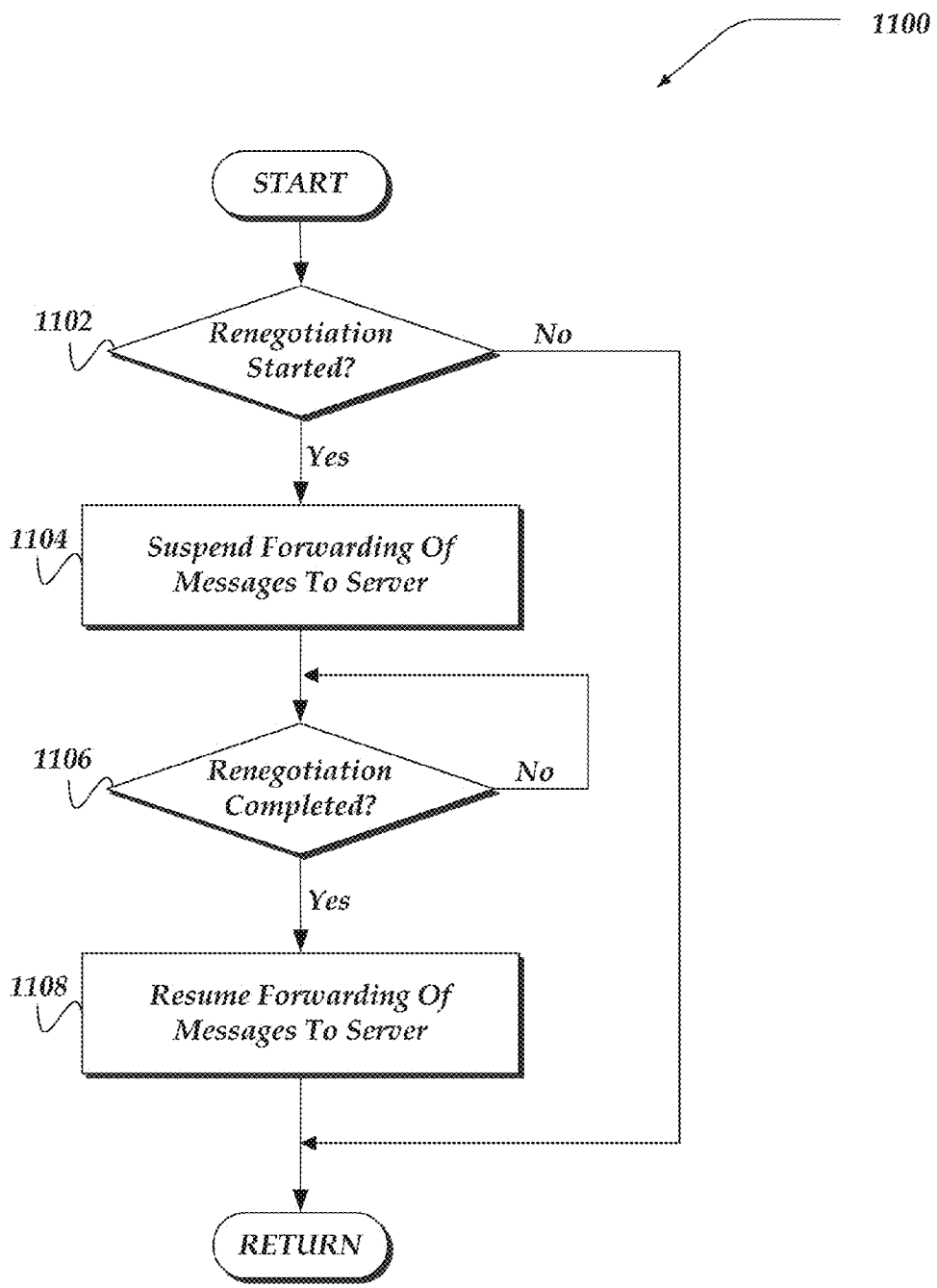
FIG. 11 illustrates a logical flow diagram showing one embodiment of a process for managing the renegotiation of an encrypted session.

Because the end-to-end encrypted session may be maintained between the client and the authentication server, the authentication server may be enabled to periodically re-validate the client to ensure that the client is still trusted. The authentication server may further be enabled to abort or otherwise end the client's communication to a server through the TMD if the authentication server determines that the client is no longer trusted. FIG. 11 illustrates an embodiment of a process for renegotiation of the encrypted session between client and authentication server. In some embodiments, process 1100 shown in FIG. 11 may be implemented as an application, program, software module or the like that executes within mass memory of the TMD, for example encrypted session manager 252 of FIG. 2. In some embodiments, such process may execute as a sub-process spawned by process 1000, or independently of process 1000.

Following a start block, process 1100 proceeds to decision block 1102 where a determination is made that a renegotiation of the encrypted session between the client and authentication server has started. Such renegotiation may be requested or otherwise triggered by the authentication server, the client, the TMD, and/or another network device. In some embodiments, the determination that a renegotiation has started may be based on monitoring of messages sent between the authentication server and client. The TMD may be configured to decrypt such messages based on a key (as discussed herein), and may determine that a renegotiation has begun by detecting SSL handshake messages exchanged between client and authentication server, for example. If it is determined at decision block 1102 that a renegotiation has not started, process 1100 may return, or may continue monitoring communications for a renegotiation.

If it is determined that a renegotiation has started, forwarding of the intercepted messages to the server is suspended at block 1104. Proceeding to decision block 1106, a determination is made whether the renegotiation has completed. This determination may be based on decryption and analysis of messages sent between authentication server and client. For example, determination may include monitoring and identifying messages that indicate a successful re-establishment of an SSL session between client and authentication server. If it is determined that the renegotiation has not completed, monitoring and/or analysis of the traffic may continue until it is determined that renegotiation is complete. In some embodiments, monitoring may continue for a predetermined period of time, or may continue indefinitely until detection of a successful re-establishment of the SSL session between client and authentication server.

If it is determined that renegotiation has completed, such that an encrypted session has been re-established between client and authentication server, forwarding of the intercepted messages to the server is resumed at block 1108. Such forwarding may proceed as described with regard to FIG. 10. Following block 1108, process 1100 may return.

It will be understood that figures, and combinations of steps in the flowchart-like illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. These program instructions may be stored on a computer readable medium or machine readable medium, such as a computer readable storage medium.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware-based systems which perform the specified actions or steps, or combinations of special purpose hardware and computer instructions.

The above specification, examples, and data provide a complete description of the manufacture and use of the composition of the described embodiments. Since many embodiments can be made without departing from the spirit and scope of this description, the embodiments reside in the claims hereinafter appended.

What is claimed as new and desired to be protected by Letters Patent of the United States is:

1. A traffic management device for managing network traffic between a client device and a plurality of server devices, comprising:
    a transceiver to communicate over a network; and
    one or more processors, in communication with the transceiver, that execute instructions that perform actions, including:
        intercepting a message sent from the client device toward an authentication server device over an encrypted first connection, wherein the client device is authenticated over the first encrypted connection by the authentication server device; and employing a key associated with the first connection to selectively forward the intercepted message toward a server device over a second connection that is separate from the encrypted first connection.

2. The traffic management device of claim 1, wherein the key associated with the first connection is employed to analyze the intercepted message, and wherein the analysis is employed to selectively forward the intercepted message.

3. The traffic management device of claim 1, wherein the encrypted first connection is established using a two-way authentication between the client device and the authentication server device.

4. The traffic management device of claim 1, further comprising another traffic management device that manages network traffic for the server device, wherein the other traffic management device performs decryption and encryption for messages communicated over one or more connections with the server device.

5. The traffic management device of claim 1, wherein the actions further include:

receiving from the determined server device a response message to the forwarded intercepted message;

encrypting the response message based on the key; and forwarding the encrypted response message to the client device, using the first connection.

6. A system for managing network traffic, comprising:

a plurality of server devices;

an authentication server device; and a traffic management device configured to perform actions including:

intercepting a message sent from a client device toward an authentication server device over an encrypted first connection, wherein the client device is authenticated over the first encrypted connection by the authentication server device; and employing a key associated with the first connection to selectively forward the intercepted message toward a server device over a second connection that is separate from the encrypted first connection.

7. The system of claim 6, wherein the key associated with the first connection is employed to analyze the intercepted message, and wherein the analysis is employed to selectively forward the intercepted message.

8. The system of claim 6, wherein the encrypted first connection is established using a two-way authentication between the client device and the authentication server device.

9. The system of claim 6, further comprising another traffic management device that manages network traffic for the server device, wherein the other traffic management device performs decryption and encryption for messages communicated over one or more connections with the server device.

10. The system of claim 6, wherein the actions further include:

receiving from the determined server device a response message to the forwarded intercepted message;

encrypting the response message based on the key; and forwarding the encrypted response message to the client device, using the first connection.

11. The system of claim 6, wherein the actions further include forwarding the intercepted message to the authentication server device, wherein the authentication server device is logs information included in the intercepted message.

12. A method for managing network traffic between a client device and a plurality of server devices over a network, wherein a traffic management device is operative to perform actions, comprising:

intercepting a message sent from the client device toward an authentication server device over an encrypted first connection, wherein the client device is authenticated over the first encrypted connection by the authentication server device; and employing a key associated with the first connection to selectively forward the intercepted message toward a server device over a second connection that is separate from the encrypted first connection.

13. The method of claim 12, wherein the key associated with the first connection is employed to analyze the intercepted message, and wherein the analysis is employed to selectively forward the intercepted message.

14. The method of claim 12, wherein the encrypted first connection is established using a two-way authentication between the client device and the authentication server device.

15. The method of claim 12, further comprising another traffic management device that manages network traffic for the server device, wherein the other traffic management device performs decryption and encryption for messages communicated over one or more connections with the server device.

16. The method of claim 12, wherein the actions further include:

receiving from the determined server device a response message to the forwarded intercepted message;

encrypting the response message based on the key; and forwarding the encrypted response message to the client device, using the first connection.

17. The method of claim 12, wherein the actions further include forwarding the intercepted message to the authentication server device, wherein the authentication server device is logs information included in the intercepted message.

* * * * *